US010683618B2

(12) United States Patent
Pratt et al.

(10) Patent No.: US 10,683,618 B2
(45) Date of Patent: Jun. 16, 2020

(54) PROCESS OF MAKING A MULTI-PLY FIBROUS WATER SOLUBLE PRODUCT

(71) Applicant: The Procter & Gamble Company, Cincinnati, OH (US)

(72) Inventors: Michael Sean Pratt, St. Bernard, OH (US); Anthony Edward Reed, West Chester, OH (US); Stephen Robert Glassmeyer, Cincinnati, OH (US); Mark Robert Sivik, Mason, OH (US); Dinah Achola Nyangiro, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 87 days.

(21) Appl. No.: 15/881,156

(22) Filed: Jan. 26, 2018

(65) Prior Publication Data
US 2019/0234023 A1 Aug. 1, 2019

(51) Int. Cl.
D21H 27/32 (2006.01)
D06H 7/04 (2006.01)
(Continued)

(52) U.S. Cl.
CPC .............. *D21H 27/32* (2013.01); *B32B 5/02* (2013.01); *B32B 38/0004* (2013.01);
(Continued)

(58) Field of Classification Search
CPC ............ B32B 2307/7166; B32B 38/18; B32B 38/1808; B32B 38/1825; B32B 38/1833;
(Continued)

(56) References Cited

U.S. PATENT DOCUMENTS 3,402,227 A * 9/1968 Knee .................. D04H 3/03
264/438
3,916,447 A 11/1975 Thompson
(Continued)

FOREIGN PATENT DOCUMENTS

EP 2540892 B1 4/2014

OTHER PUBLICATIONS

GetChem, Sodium C14-16 Olefin Sulfonate Product Information, Internet Archive capture dated Dec. 8, 2016 (http://www.getchem.com/ui/product/65.html) (Year: 2016).*
(Continued)

*Primary Examiner* — Michael N Orlando
*Assistant Examiner* — Christopher W Raimund
(74) *Attorney, Agent, or Firm* — Gary J. Foose

(57) ABSTRACT

A process for manufacturing a water soluble product including the steps of: providing a water soluble fibrous parent continuous ply web, the parent continuous ply web extending in the cross direction between an operator edge and drive edge; cutting the parent continuous ply web in the machine direction to provide a first continuous ply web that includes the drive edge and a second continuous ply web that includes the operator edge; superposing the first continuous ply web and the second continuous ply web to form a web stack so that the operator edge and the drive edge are on opposite sides of a centerline of the web stack in the machine direction; and cutting and joining portions of the web stack to form the water soluble product.

14 Claims, 8 Drawing Sheets

(51) Int. Cl.
    B32B 5/02       (2006.01)
    B32B 38/00      (2006.01)
    D21H 27/30      (2006.01)
(52) U.S. Cl.
    CPC ............ B32B 38/145 (2013.01); D06H 7/04
        (2013.01); D21H 27/30 (2013.01); *B32B*
        *2555/00* (2013.01)
(58) Field of Classification Search
    CPC ... B32B 38/1841; B32B 38/185; B32B 3/263;
        B32B 38/145; B32B 38/0004; B32B 5/02;
        B32B 2555/00; Y10T 156/1067; Y10T
        156/1069; D21H 27/32; D21H 27/30;
        D06H 7/04
    See application file for complete search history.

(56)           References Cited

U.S. PATENT DOCUMENTS 5,053,157  A   10/1991  Lloyd
    5,458,590  A   10/1995  Schleinz
    8,785,361  B2   7/2014  Sivik
    8,980,816  B2   3/2015  Dreher
    9,139,802  B2   9/2015  Weisman 2003/0084994  A1*  5/2003  Simon .................. A61K 8/0208
                                                        156/308.2
    2005/0266760  A1  12/2005  Chhabra
    2009/0286437  A1  11/2009  Cunningham
    2010/0084084  A1*  4/2010  Miller, II ................ B32B 37/02
                                                        156/249
    2013/0004552  A1*  1/2013  Pedoja ..................... D04H 5/02
                                                        424/401
    2013/0171421  A1   7/2013  Weisman et al.
    2013/0172166  A1*  7/2013  Erguen ................ A61F 13/5116
                                                        493/345
    2016/0101026  A1   4/2016  Pratt
    2016/0129626  A1*  5/2016  Arora ..................... B32B 5/022
                                                        264/40.1
    2017/0282525  A1  10/2017  Cabell
    2018/0216052  A1   8/2018  Denome
    2018/0216053  A1   8/2018  Denome
    2019/0232604  A1   8/2019  Pratt
    2019/0233970  A1   8/2019  Reed
    2019/0233974  A1   8/2019  Reed

OTHER PUBLICATIONS

International Search Report for International Application Serial No.
PCT/US2019/014451, dated Apr. 24, 2019, 12 pages.
All Office Actions for U.S. Appl. No. 15/881,124.

* cited by examiner

PROCESS OF MAKING A MULTI-PLY FIBROUS WATER SOLUBLE PRODUCT

FIELD OF THE INVENTION

Multi-ply fibrous water soluble unit dose articles and process of making.

BACKGROUND OF THE INVENTION

Fibrous water soluble unit dose articles are of increasing interest to consumers. The technology related to such articles continues to advance in terms of providing the desired active agents with the articles enabling the consumers to do the job that they wish to accomplish.

In the realm of consumer goods, delivering the right active agents is just not enough to satisfy consumers. The look and feel of the product is often important to consumers' perceptions.

Fibrous substrates have historically been used in consumer goods including dryer sheets, toilet goods, and wipes. Such products have tended to be floppy and drape around consumers' hands or fingers when the product is used. This can make the products difficult or unenjoyable for consumers to handle neatly. For such products that include active agents, it may be desirable to limit the contact between the consumer's hand and the active agents. Some fibrous substrates have a surface texture that some consumers find to be tactilely deficient. Further, when active agents are carried by fibrous substrates, the consumer may find it unpleasant to touch the active agent.

Fabricating multi-ply articles can be challenging since the individual plies of the articles need to be bonded to one another to form a coherent product. Bonding and cutting multi-ply articles can be difficult if caliper of an individual article varies across the surface of the article.

With these limitations in mind, there is a continuing unaddressed need for processes to make fibrous water soluble unit dose articles that have controlled caliper.

SUMMARY OF THE INVENTION

A process for manufacturing a water soluble product comprising the steps of: providing a water soluble fibrous parent continuous ply web, the parent continuous ply web having a machine direction and cross direction orthogonal to the machine direction and a thickness in a direction orthogonal to a plane defined by the machine direction and the cross direction, wherein the parent continuous ply web extends in the cross direction between an operator edge and drive edge wherein the parent continuous ply web is thicker between the operator edge and the drive edge than at the drive edge and the operator edge; cutting the parent continuous ply web in the machine direction to provide a first continuous ply web that includes the drive edge and a second continuous ply web that includes the operator edge; superposing the first continuous ply web and the second continuous ply web to form a web stack so that the operator edge and the drive edge are on opposite sides of a centerline of the web stack in the machine direction; and cutting and joining portions of the web stack to form the water soluble product.

DETAILED DESCRIPTION OF THE INVENTION

Figure 1:
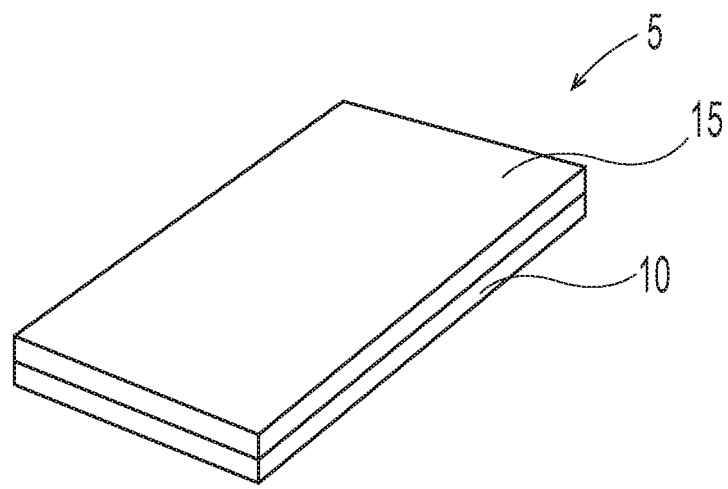
FIG. 1 is a product.

A water soluble product 5 is shown in FIG. 1. The water soluble product 5 can comprise a water soluble fibrous lower ply 10 and water soluble fibrous upper ply 15 that are superposed relative to one another. The lower ply 10 and upper ply 15 are joined to one another to form a unitary water soluble product 5. The water soluble product 5 can have a mass from about 50 mg to about 30 g, optionally about 100 mg to about 20 g, optionally about 1 g to about 20 g. The water soluble product 5 can have a length and width from about 5 mm to about 20 cm, optionally from about 1 cm to about 10 cm, and a thickness from about 1 mm to about 2 cm, optionally about 2 mm to about 10 mm.

For the types of water soluble fibrous plies described herein, it can be challenging to manufacture an individual ply that is rigid enough so as not to be floppy when the consumer uses the product. The water soluble product may have planar area of between about 1 $cm^2$ and about 100 $cm^2$. The stiffness of a fibrous ply can be function of thickness of the ply, the strength and stiffness of the individual fibers constituting the ply, the quantity of inter-fiber bonds, the degree and nature of entanglement of the fibers, and the strength of the inter-fiber bonds. For the fibers constituting the fibrous plies discussed herein, it can be difficult to provide for sufficiently thick ply, having sufficiently strong and stiff water soluble fibers, that are sufficiently inter-bonded and entangled with one another in a desired structure, and bonded with one another such that a ply made of such fibers is not floppy under its self-weight.

Providing a multi-ply water soluble product 5 can help to overcome these limitations. The increased thickness of the water soluble product achieved by layering and joining plies can provide for higher in-plane bending stiffness since the moment of inertia about the bending axis is increased. Such products 5 are not as floppy as thinner single ply products. Further, the increased thickness of such products 5 make them easier for the consumer to grasp and handle. Further multi-ply products 5 provide for positions interior to the product where active agents can be placed so that the consumer does not come into contact with the active agent.

The plies of the water soluble product 5 can be viewed hierarchically starting from the form in which the consumer interacts with the water soluble product 5 and working backward to the raw materials from which the plies are made.

I. Fibrous Plies
A. Fibrous Structures

The fibrous plies can be fibrous structures. Fibrous structures comprise one or more fibrous elements. The fibrous elements can be associated with one another to form a structure. Fibrous structures can include particles within and or on the structure. Fibrous structures can be homogeneous, layered, unitary, zoned, or as otherwise desired, with different active agents defining the various aforesaid portions.

Figure 2:
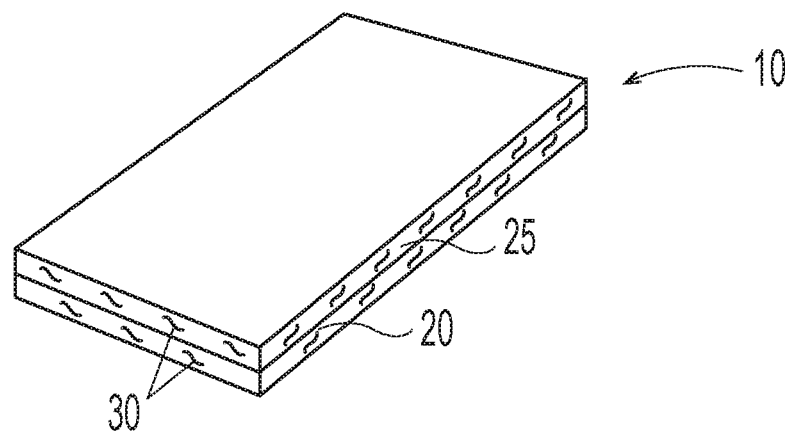
FIG. 2 is a first ply having a first layer and a second layer.

A fibrous structure can comprise one or more layers, the layers together forming the ply. For instance, as shown in FIG. 2, the lower ply 10 can comprise a first layer 20 and a second layer 25. The first layer 20 and second layer 25 can comprise a plurality of fibrous elements 30. The lower ply 10 can comprise a plurality of particles at a location selected from the group consisting of the first layer 20, the second layer 25, between the first layer 20 and second layer 25, and combinations thereof. A ply having a plurality of layers can be formed by depositing a plurality of fibrous elements 30 having a distinguishing characteristic to form a first layer 20 and then depositing a second layer 25 of fibrous elements 30 on top of the first layer 20. For clarity, for multilayer plies, there can be intermingling of fibers constituting the layers. Further, for clarity, there can be intermingling of fibers constituting the plies.

A fibrous structure can comprise a plurality of identical or substantially identical from a compositional perspective of fibrous elements 30. Optionally, the fibrous structure may comprise two or more different fibrous elements 30. Non-limiting examples of differences in the fibrous elements 30 may be physical differences such as differences in diameter, length, texture, shape, rigidness, elasticity, and the like; chemical differences such as crosslinking level, solubility, melting point, glass transition temperature, active agent, filament-forming material, color, level of active agent, basis weight, level of filament-forming material, presence of any coating on fibrous element, biodegradable or not, hydrophobic or not, contact angle, and the like; differences in whether the fibrous element 30 loses its physical structure when the fibrous element is exposed to conditions of intended use; differences in whether the fibrous element's 30 morphology changes when the fibrous element 30 is exposed to conditions of intended use; and differences in rate at which the fibrous element 30 releases one or more of its active agents when the fibrous element 30 is exposed to conditions of intended use. In one example, two or more fibrous elements 30 and/or particles within the fibrous structure may comprise different active agents.

The fibrous structure may exhibit different regions, such as different regions of basis weight, density and/or caliper, surface texture, pattern of fibrous structure, embossing pattern, apertures, apertures in a pattern, and the like.

Non-limiting examples of use of the fibrous structure of the present invention include, but are not limited to a dissolvable and/or meltable substrate used in a washing machine, in a laundry dryer, treat a hard surface for cleaning and/or polishing, treat a floor for cleaning and/or polishing substrate, to treat skin, to apply insect repellant, to treat swimming pools, as a breath freshener, a deodorant, as a wound dressing, for medicine delivery, skin care substrate, hair care substrate, air care substrate, water treatment substrate and/or filter, toilet bowl cleaning substrate, candy substrate, teeth whitening substrates, carpet cleaning substrates, and other suitable uses of the active agents of the present invention.

The fibrous structure of the present invention may be used as is or may be coated with one or more active agents.

B. Fibrous Elements

The fibrous elements 30 may be water soluble. The fibrous elements 30 can comprise constituent material selected from the group consisting of one or more filament forming materials, one or more active agents, and combinations thereof. The active agents may be releasable from the fibrous elements 30, such as when the fibrous element 30 and/or fibrous structure comprising the fibrous element 30 is exposed to conditions of intended use.

The fibrous elements 30 can comprise from about 5% to about 100% by weight on a dry fibrous element basis and/or dry fibrous structure basis of one or more filament-forming materials. The fibrous elements 30 can comprise from about 5% to about 100% by weight on a dry fibrous element basis and/or dry fibrous structure basis of one or more filament-forming materials and from about 5% to about 95% by weight by weight on a dry fibrous element basis and/or dry fibrous structure basis one or more active agents.

The fibrous elements 30 can comprise more than about 50% by weight on a dry fibrous element basis and/or dry fibrous structure basis of one or more filament-forming materials and less than about 50% by weight on a dry fibrous element basis and/or dry fibrous structure basis of one or more active agents.

The fibrous elements 30 can comprise less than about 50% by weight on a dry fibrous element basis and/or dry fibrous structure basis of one or more filament-forming materials and more than about 50% by weight on a dry fibrous element basis and/or dry fibrous structure basis of one or more active agents.

A fibrous element 30 can comprise one or more filament-forming materials and one or more active agents selected from the group consisting of: enzymes, bleaching agents, builder, chelants, sensates, dispersants, perfumes, antimicrobials, antibacterials, antifungals, and mixtures thereof that are releasable and/or released when the fibrous element and/or fibrous structure comprising the fibrous element is exposed to conditions of intended use.

The fibrous elements 30 may be meltblown fibrous elements 30, spunbond fibrous elements 30, hollow fibrous elements 30, or the like. The fibrous elements 30 may be hydrophilic or hydrophobic. The fibrous elements 30 may be surface treated and/or internally treated to change the inherent hydrophilic or hydrophobic properties of the fibrous element. The fibrous elements 30 can have a diameter of less than about 100 µm and/or less than about 75 µm and/or less than about 50 µm and/or less than about 25 µm and/or less than about 10 µm and/or less than about 5 µm and/or less than about 1 µm as measured according to the Diameter Test Method described herein. The fibrous elements 30 can have a diameter from about 1 µm to about 500 µm, optionally about 1 µm to about 100 µm, optionally about 1 µm to about 50 µm, optionally about 1 µm to about 30 µm, optionally about 5 µm to about 15 µm, optionally about 7 µm to about 15 µm according to the Diameter Test Method described herein. The fibrous elements 30 can have a diameter of greater than about 1 µm as measured according to the Diameter Test Method described herein. The smaller the diameter the faster the rate of release of the active agents and the rate of loss and or altering of the fibrous element's 30 physical structure.

The fibrous element 30 may comprise an active agent within the fibrous element and an active agent on an external surface of the fibrous element 30, such as an active agent coating on the fibrous element 30. The active agent on the external surface of the fibrous element 30 may be the same or different from the active agent present in the fibrous element 30. If different, the active agents may be compatible or incompatible with one another.

The one or more active agents may be uniformly distributed or substantially uniformly distributed throughout the fibrous element 30. The one or more active agents may be distributed as discrete regions within the fibrous element 30.

The active agent can be distributed uniformly or substantially uniformly throughout the fibrous element 30 and at least one other active agent is distributed as one or more discrete regions within the fibrous element 30. Optionally, at least one active agent is distributed as one or more discrete regions within the fibrous element 30 and at least one other active agent is distributed as one or more discrete regions different from the first discrete regions within the fibrous element 30.

C. Filament Forming Material

The filament-forming material is any suitable material, such as a polymer or monomers capable of producing a polymer that exhibits properties suitable for making a filament, such as by a spinning process. The filament-forming material may comprise a polar solvent-soluble material, such as an alcohol-soluble material and/or a water-soluble material, which can be beneficial for product applications that include use of water.

The filament-forming material may comprise a non-polar solvent-soluble material.

The filament-forming material may comprise a water-soluble material and be free (less than 5% and/or less than 3% and/or less than 1% and/or 0% by weight on a dry fibrous element basis and/or dry fibrous structure basis) of water-insoluble materials.

The filament-forming material may comprise a polymer selected from the group consisting of: polymers derived from acrylic monomers such as the ethylenically unsaturated carboxylic monomers and ethylenically unsaturated monomers, polyvinyl alcohol, polyvinylformamide, polyvinylamine, polyacrylates, polymethacrylates, copolymers of acrylic acid and methyl acrylate, polyvinylpyrrolidones, polyalkylene oxides, starch and starch derivatives, pullulan, gelatin, and cellulose derivatives (for example, hydroxypropylmethyl celluloses, methyl celluloses, carboxymethy celluloses).

The filament-forming material may comprise a polymer selected from the group consisting of: polyvinyl alcohol, polyvinyl alcohol derivatives, starch, starch derivatives, cellulose derivatives, hemicellulose, hemicellulose derivatives, proteins, sodium alginate, hydroxypropyl methylcellulose, chitosan, chitosan derivatives, polyethylene glycol, tetramethylene ether glycol, polyvinyl pyrrolidone, hydroxymethyl cellulose, hydroxyethyl cellulose, carboxymethyl cellulose, and mixtures thereof.

The filament-forming material may comprise a polymer selected from the group consisting of: pullulan, hydroxypropylmethyl cellulose, hydroxyethyl cellulose, hydroxypropyl cellulose, polyvinyl pyrrolidone, carboxymethylcellulose, sodium alginate, xanthan gum, tragacanth gum, guar gum, acacia gum, Arabic gum, polyacrylic acid, methylmethacrylate copolymer, carboxyvinyl polymer, dextrin, pectin, chitin, levan, elsinan, collagen, gelatin, zein, gluten, soy protein, casein, polyvinyl alcohol, carboxylated polyvinyl alcohol, sulfonated polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

1. Water-Soluble Materials

Non-limiting examples of water-soluble materials include water-soluble polymers. The water-soluble polymers may be synthetic or natural original and may be chemically and/or physically modified.

Non-limiting examples of water-soluble polymers include water-soluble hydroxyl polymers, water-soluble thermoplastic polymers, water-soluble biodegradable polymers, water-soluble non-biodegradable polymers and mixtures thereof. The water-soluble polymer may comprise polyvinyl alcohol. In another example, the water-soluble polymer may comprise starch. The water-soluble polymer may comprise polyvinyl alcohol and starch. The water-soluble polymer may comprise carboxymethyl cellulose. The polymer may comprise carboxymethyl cellulose and polyvinyl alcohol.

a. Water-Soluble Hydroxyl Polymers

Non-limiting examples of water-soluble hydroxyl polymers in accordance with the present invention can be selected from the group consisting of polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose derivatives such as cellulose ether and ester derivatives, cellulose copolymers, hemicellulose, hemicellulose derivatives, hemicellulose copolymers, gums, arabinans, galactans, proteins, carboxymethylcellulose, and various other polysaccharides and mixtures thereof.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, maleic acid, itaconic acid, sodium vinylsulfonate, sodium allylsulfonate, sodium methylallyl sulfonate, sodium phenylallylether sulfonate, sodium phenylmethallylether sulfonate, 2-acrylamido-methyl propane sulfonic acid (AMPs), vinylidene chloride, vinyl chloride, vinyl amine and a variety of acrylate esters.

In one example, the water-soluble hydroxyl polymer is selected from the group consisting of: polyvinyl alcohols, hydroxymethylcelluloses, hydroxyethylcelluloses, hydroxypropylmethylcelluloses, carboxymethylcelluloses, and mixtures thereof. A non-limiting example of a suitable polyvinyl alcohol includes those commercially available from Sekisui Specialty Chemicals America, LLC (Dallas, Tex.) under the CELVOL (Registered trademark) trade name. Another non-limiting example of a suitable polyvinyl alcohol includes G Polymer commercially available from Nippon Ghosei. A non-limiting example of a suitable hydroxypropylmethyl-cellulose includes those commercially available from the Dow Chemical Company (Midland, Mich.) under the METHOCEL (Registered trademark) trade name including combinations with above mentioned polyvinyl alcohols.

b. Water-Soluble Thermoplastic Polymers

Non-limiting examples of suitable water-soluble thermoplastic polymers include thermoplastic starch and/or starch derivatives, polylactic acid, polyhydroxyalkanoate, polycaprolactone, polyesteramides and certain polyesters, and mixtures thereof. The water-soluble thermoplastic polymers may be hydrophilic or hydrophobic. The water-soluble thermoplastic polymers may be surface treated and/or internally treated to change the inherent hydrophilic or hydrophobic properties of the thermoplastic polymer. The water-soluble thermoplastic polymers may comprise biodegradable polymers. Any suitable weight average molecular weight for the thermoplastic polymers may be used. For example, the weight average molecular weight for a thermoplastic polymer in accordance with the present invention can be greater than about 10,000 g/mol and/or greater than about 40,000 g/mol and/or greater than about 50,000 g/mol and/or less than about 500,000 g/mol and/or less than about 400,000 g/mol and/or less than about 200,000 g/mol.

D. Active Agents

Active agents are a class of additives that are designed and intended to provide a benefit to something other than the fibrous element and/or particle and/or fibrous structure itself, such as providing a benefit to an environment external to the fibrous element and/or particle and/or fibrous structure. The active agent may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; liquid and/or powder dishwashing agents (for hand dishwashing and/or automatic dishwashing machine applications), hard surface care agents, and/or conditioning agents and/or polishing agents; other cleaning and/or conditioning agents such as antimicrobial agents, antibacterial agents, antifungal agents, fabric hueing agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, dye transfer-inhibiting agents, clay soil removing agents, anti-redeposition agents, polymeric soil release agents, polymeric dispersing agents, alkoxylated polyamine polymers, alkoxylated polycarboxylate polymers, amphilic graft copolymers, dissolution aids, buffering systems, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; ingestible active agents such as medicinal agents, teeth whitening agents, tooth care agents, mouthwash agents, periodontal gum care agents, edible agents, dietary agents, vitamins, minerals; water-treatment agents such as water clarifying and/or water disinfecting agents, and mixtures thereof.

1. Surfactants

Non-limiting examples of suitable surfactants include anionic surfactants, cationic surfactants, nonionic surfactants, zwitterionic surfactants, amphoteric surfactants, and mixtures thereof. Co-surfactants may also be included in the fibrous elements 30 and/or particles. For fibrous elements 30 and/or particles designed for use as laundry detergents and/or dishwashing detergents, the total level of surfactants should be sufficient to provide cleaning including stain and/or odor removal, and generally ranges from about 0.5% to about 95%. Further, surfactant systems comprising two or more surfactants that are designed for use in fibrous elements 30 and/or particles for laundry detergents and/or dishwashing detergents may include all-anionic surfactant systems, mixed-type surfactant systems comprising anionic-nonionic surfactant mixtures, or nonionic-cationic surfactant mixtures or low-foaming nonionic surfactants. The surfactants herein can be linear or branched. In one example, suitable linear surfactants include those derived from agrochemical oils such as coconut oil, palm kernel oil, soybean oil, or other vegetable-based oils.

2. Perfumes

One or more perfume and/or perfume raw materials such as accords and/or notes may be incorporated into one or more of the fibrous elements 30 and/or particles of the present invention. The perfume may comprise a perfume ingredient selected from the group consisting of: aldehyde perfume ingredients, ketone perfume ingredients, esters, and mixtures thereof. Also included are various natural extracts and essences which can comprise complex mixtures of ingredients, such as orange oil, lemon oil, rose extract, lavender, musk, patchouli, balsamic essence, sandalwood oil, pine oil, cedar, and the like. In one example, a finished perfume typically comprises from about 0.01% to about 2% by weight on a dry fibrous element basis and/or a dry particle basis and/or dry fibrous structure basis.

The perfume can be delivered by a perfume delivery system. The perfume delivery system can be a polymer assisted delivery system. This perfume delivery technology uses polymeric materials to deliver perfume materials. Classical coacervation, water soluble or partly soluble to insoluble charged or neutral polymers, liquid crystals, hot melts, hydrogels, perfumed plastics, encapsulated perfume, nano- and micro-latexes, polymeric film formers, and polymeric absorbents, polymeric adsorbents, etc. are some examples. The polymer assisted delivery system can be a matrix system in which the fragrance is dissolved or dispersed in a polymer matrix or particle.

The perfume delivery system can be an encapsulate. Encapsulated perfumes comprise a core that is the perfume and a shell that is the encapsulate wall. The encapsulate can be a pressure sensitive encapsulate.

The perfume delivery system can be a fiber assisted delivery system. The perfume can be loaded and or stored on the surface of the fiber or absorbed into the fiber. When used, the perfume can be released from the fiber.

The perfume delivery system can be an amine assisted delivery system. Amine assisted delivery systems can comprise a material that has an amine group to increase perfume deposition and or modify perfume release during product use. Amine assisted delivery system materials suitable for use herein may be non-aromatic; for example, polyalkylimine, such as polyethyleneimine (PEI), or polyvinylamine (PVAm), or aromatic, for example, anthranilates. Such materials may also be polymeric or non-polymeric. In one aspect, such materials contain at least one primary amine.

The perfume delivery system can be a cyclodextrin delivery system. This technology approach uses a cyclic oligosaccharide or cyclodextrin to improve the delivery of perfume. Typically, a perfume and cyclodextrin complex is formed.

The perfume delivery system can be a starch encapsulated accord. This technology employs liquid perfume converted to a solid by adding ingredients such as starch.

The perfume delivery system can be an inorganic carrier delivery system. In such a system, perfume is loaded onto an inorganic carrier, for example zeolite, porous zeolite, or other inorganic material.

The perfume delivery system can be a pro perfume. This technology comprises a perfume covalently bonded to a carrier. The pro perfume can be an amine reaction product. That is, a polymeric amine reacted with one or more perfume raw material to form the amine reaction product.

3. Antimicrobials, Antibacterials, and Antifungals

The active agent can be selected from the group consisting of an antimicrobial, antibacterial, antifungal, and combinations thereof.

4. Bleaching Agent

The fibrous elements 30 and or particles of the present invention may comprise one or more bleaching agents. Non-limiting examples of suitable bleaching agents include peroxyacids, perborate, percarbonate, chlorine bleaches, peroxygen bleach, percarboxylic acid bleach and salts thereof, oxygen bleaches, persulfate bleach, hypohalite bleaches, bleach precursors, bleach activators, bleach catalysts, hydrogen peroxide, bleach boosters, photobleaches, bleaching enzymes, free radical initiators, peroxygen bleaches, and mixtures thereof.

One or more bleaching agents may be included in the fibrous elements 30 and/or particles of the present invention may be included at a level from about 0.05% to about 30% and/or from about 1% to about 20% by weight on a dry fibrous element basis and/or dry particle basis and/or dry fibrous structure basis. If present, bleach activators may be present in the fibrous elements 30 and/or particles of the present invention at a level from about 0.1% to about 60% and/or from about 0.5% to about 40% by weight on a dry fibrous element basis and/or dry particle basis and/or dry fibrous structure basis.

5. Dye Transfer Inhibiting Agent

The fibrous elements 30 and/or particles may include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. The dye transfer inhibiting agents may be present in the fibrous elements 30 and/or particles and/or fibrous structure products of the present invention at levels from about 0.0001% to about 10%, from about 0.01% to about 5% or even from about 0.1% to about 3% by weight on a dry fibrous element basis and/or dry particle basis and/or dry fibrous structure basis.

6. Brighteners

The fibrous elements 30 and/or particles of the present invention may contain active agents, such as brighteners, for example fluorescent brighteners. Such brighteners may tint articles being cleaned. The fibrous elements 30 and/or particles may comprise C.I. fluorescent brightener 260 in alpha-crystalline form.

7. Hueing Agents

The composition may comprise a hueing agent. Suitable hueing agents include dyes, dye-clay conjugates, and pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid. Red, Acid Violet, Basic Blue, Basic Violet and Basic Red, or mixtures thereof.

In another aspect, suitable small molecule dyes include small molecule dyes selected from the group consisting of Colour Index (Society of Dyers and Colourists, Bradford, UK) numbers Direct Violet 9, Direct Violet 35, Direct Violet 48, Direct Violet 51, Direct Violet 66, Direct Violet 99, Direct Blue 1, Direct Blue 71, Direct Blue 80, Direct Blue 279, Acid Red 17, Acid Red 73, Acid Red 88, Acid Red 150, Acid Violet 15, Acid Violet 17, Acid Violet 24, Acid Violet 43, Acid Red 52, Acid Violet 49, Acid Violet 50, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, Acid Black 1, Basic Violet 1, Basic Violet 3, Basic Violet 4, Basic Violet 10, Basic Violet 35, Basic Blue 3, Basic Blue 16, Basic Blue 22, Basic Blue 47, Basic Blue 66, Basic Blue 75, Basic Blue 159 and mixtures thereof. In another aspect, suitable small molecule dyes include small molecule dyes selected from the group consisting of Colour Index (Society of Dyers and Colourists, Bradford, UK) numbers Acid Violet 17, Acid Violet 43, Acid Red 52, Acid Red 73, Acid Red 88, Acid Red 150, Acid Blue 25, Acid Blue 29, Acid Blue 45, Acid Blue 113, Acid Black 1, Direct Blue 1, Direct Blue 71, Direct Violet 51 and mixtures thereof. In another aspect, suitable small molecule dyes include small molecule dyes selected from the group consisting of Colour Index (Society of Dyers and Colourists, Bradford, UK) numbers Acid Violet 17, Direct Blue 71, Direct Violet 51, Direct Blue 1, Acid Red 88, Acid Red 150, Acid Blue 29, Acid Blue 113 or mixtures thereof.

The active agent may be pigment. Suitable pigments can include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

Suitable pigments include pigments selected from the group consisting of Ultramarine Blue (C.I. Pigment Blue 29), Ultramarine Violet (C.I. Pigment Violet 15) and mixtures thereof.

8. Enzymes

One or more enzymes may be present in the fibrous elements 30 and/or particles of the present invention. Non-limiting examples of suitable enzymes include proteases, amylases, lipases, cellulases, carbohydrases including mannanases and endoglucanases, pectinases, hemicellulases, peroxidases, xylanases, phospholipases, esterases, cutinases, keratanases, reductases, oxidases, phenoloxidases, lipoxygenases, ligninases, pullulanases, tannases, penosanases, malanases, glucanases, arabinosidases, hyaluraonidases, chrondroitinases, laccases, and mixtures thereof.

When present in the fibrous elements 30 and/or particles of the present invention, the enzymes may be present at levels sufficient to provide a "cleaning-effective amount". The term "cleaning effective amount" refers to any amount capable of producing a cleaning, stain removal, soil removal, whitening, deodorizing, or freshness improving effect on substrates such as fabrics, dishware, flooring, porcelain and ceramics, metal surfaces and the like. In practical terms for current commercial preparations, typical amounts are up to about 5 mg by weight, more typically 0.01 mg to 3 mg, of active enzyme per gram of the fibrous element and/or particle of the present invention. Stated otherwise, the fibrous elements 30 and/or particles of the present invention will typically comprise from about 0.001% to about 5% and/or from about 0.01% to about 3% and/or from about 0.01% to about 1% by weight on a dry fibrous element basis and/or dry particle basis and/or dry fibrous structure basis.

One or more enzymes may be applied to the fibrous element and/or particle after the fibrous element and/or particle is produced.

When enzymes are present in the fibrous elements 30 and/or particles of the present invention, an enzyme stabilizing system may also be included in the fibrous elements 30 and/or particles. Enzymes may be stabilized by various techniques.

9. Heat Forming Agents

The fibrous elements 30 and/or particles of the present invention may contain a heat forming agent. Heat forming agents are formulated to generate heat in the presence of water and/or oxygen (e.g., oxygen in the air, etc.) and to thereby accelerate the rate at which the fibrous structure degrades in the presence of water and/or oxygen, and/or to increase the effectiveness of one or more of the actives in the fibrous element. The heat forming agent can be used to accelerate the rate of release of one or more actives from the fibrous structure. The heat forming agent can be formulated to undergo an exothermic reaction when exposed to oxygen (i.e., oxygen in the air, oxygen in the water, etc.) and/or water. Non-limiting heat forming agents that can be used in the fibrous structure include electrolyte salts (e.g., aluminum chloride, calcium chloride, calcium sulfate, cupric chloride, cuprous chloride, ferric sulfate, magnesium chloride, magnesium sulfate, manganese chloride, manganese sulfate, potassium chloride, potassium sulfate, sodium acetate, sodium chloride, sodium carbonate, sodium sulfate, etc.), glycols (e.g., propylene glycol, dipropyleneglycol, etc.), lime (e.g., quick lime, slaked lime, etc.), metals (e.g., chromium, copper, iron, magnesium, manganese, etc.), metal oxides (e.g., aluminum oxide, iron oxide, etc.), polyalkyleneamine, polyalkyleneimine, polyvinyl amine, zeolites, glycerin, 1,3, propanediol, polysorbates esters (e.g., Tweens 20, 60, 85, 80), and/or poly glycerol esters (e.g., Noobe, Drewpol and Drewmulze from Stepan). The heat forming agent can be formed of one or more materials. For example, magnesium sulfate can singularly form the heat forming agent. In another non-limiting example, the combination of about 2-25 weight percent activated carbon, about 30-70 weight percent iron powder and about 1-10 weight percent metal salt can form the heat forming agent. As can be appreciated, other or additional materials can be used alone or in combination with other materials to form the heat forming agent.

10. Degrading Accelerator

The fibrous elements 30 and/or particles of the present invention may contain a degrading accelerator to accelerate the rate at which a fibrous structure degrades in the presence of water and/or oxygen. The degrading accelerator, when used, is generally designed to release gas when exposed to water and/or oxygen, which in turn agitates the region about the fibrous structure to cause acceleration in the degradation of a carrier film of the fibrous structure. The degrading accelerator, when used, can also or alternatively be used to accelerate the rate of release of one or more actives from the fibrous structure. The degrading accelerator can include one or more materials such as, but not limited to, alkali metal carbonates (e.g. sodium carbonate, potassium carbonate, etc.), alkali metal hydrogen carbonates (e.g., sodium hydrogen carbonate, potassium hydrogen carbonate, etc.), ammonium carbonate, etc. Non-limiting examples of activators, when used, that can be included in the fibrous structure include organic acids (e.g., hydroxy-carboxylic acids [citric acid, tartaric acid, malic acid, lactic acid, gluconic acid, etc.], saturated aliphatic carboxylic acids [acetic acid, succinic acid, etc.], unsaturated aliphatic carboxylic acids [e.g., fumaric acid, etc.].

E. Release of Active Agents

One or more active agents may be released from the fibrous element and/or particle and/or fibrous structure when the fibrous element and/or particle and/or fibrous structure is exposed to a triggering condition. The active agents may be released from the fibrous element and or fibrous structure or part thereof loses its physical structure (e.g. dissolves, melts), alters its physical structure (e.g swells, shrinks, lengthens, shortens). The active agents may be released may be released when the fibrous structure or part thereof changes in morphology.

The fibrous element and/or particle and/or fibrous structure may release an active agent upon the fibrous element and/or particle and/or fibrous structure being exposed to a triggering condition that results in the release of the active agent, such as by causing the fibrous element and/or particle and/or fibrous structure to lose or alter its identity as discussed above. Non-limiting examples of triggering conditions include exposing the fibrous element and/or particle and/or fibrous structure to solvent, a polar solvent, such as alcohol and/or water, and/or a non-polar solvent, which may be sequential, depending upon whether the filament-forming material comprises a polar solvent-soluble material and/or a non-polar solvent-soluble material; exposing the fibrous element and/or particle and/or fibrous structure to heat and or friction, and or pre-treating stains on a fabric article with the fibrous structure product, forming a wash liquor by contacting the fibrous structure product with water; tumbling the fibrous structure product in a dryer; heating the fibrous structure product in a dryer, and combinations thereof.

F. Filament-Forming Composition

The fibrous elements 30 of the present invention are made from a filament-forming composition. The filament-forming composition can be a polar-solvent-based composition. In one example, the filament-forming composition is an aqueous composition comprising one or more filament-forming materials and one or more active agents.

The filament-forming composition of the present invention may have a shear viscosity as measured according to the Shear Viscosity Test Method described herein of from about 1 Pascal.Seconds to about 25 Pascal.Seconds and/or from about 2 Pascal.Seconds to about 20 Pascal.Seconds and/or from about 3 Pascal.Seconds to about 10 Pascal.Seconds, as measured at a shear rate of 3,000 sec−1 and at the processing temperature (50 deg. C. to 100 deg. C.). The filament-forming composition may be processed at a temperature of from about 25 deg. C. to about 100 deg. C. and/or from about 65 deg. C. to about 95 deg. C. and/or from about 70 deg. C. to about 90 deg. C. when making fibrous elements 30 from the filament-forming composition.

In one example, the filament-forming composition may comprise at least 20% and/or at least 30% and/or at least 40% and/or at least 45% and/or at least 50% to about 90% and/or to about 85% and/or to about 80% and/or to about 75% by weight of one or more filament-forming materials, one or more active agents, and mixtures thereof. The filament-forming composition may comprise from about 10% to about 80% by weight of a polar solvent, such as water.

In a fibrous element spinning process, the fibrous elements 30 need to have initial stability as they leave the spinning die. Capillary number is used to characterize this initial stability criterion. At the conditions of the die, the capillary number can be from about 0.5 to about 10, at least 1 and/or at least 3 and/or at least 4 and/or at least 5.

In one example, the filament-forming composition exhibits a capillary number of from about 1 to about 50 and/or about 3 to about 50 and/or about 5 to about 30 and/or about 0.5 to about 20 and/or about 9 to about 15 and/or about 15 to about 20 such that the filament-forming composition can be effectively polymer processed into a fibrous element.

"Polymer processing" as used herein means any spinning operation and/or spinning process by which a fibrous element comprising a processed filament-forming material is formed from a filament-forming composition. The spinning operation and/or process may include spunbonding, melt blowing, electro-spinning, rotary spinning, continuous filament producing and/or tow fiber producing operations/processes. A "processed filament-forming material" as used herein means any filament-forming material that has undergone a melt processing operation and a subsequent polymer processing operation resulting in a fibrous element.

The capillary number is a dimensionless number used to characterize the likelihood of this droplet breakup. A larger capillary number indicates greater fluid stability upon exiting the die. The capillary number, $c_a$, is defined as follows:

$$c_a = \frac{V\eta}{\sigma}$$

Where V is the average fluid velocity at the die exit (units of Length per Time), η is the fluid viscosity at the conditions of the exit of the die (units of Mass per Length*Time), σ is the surface tension of the fluid (units of Mass per Time$^2$).

In one example, the filament-forming composition may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates and fatty amides, silicones, aminosilicones, fluoropolymers and mixtures thereof.

In one example, the filament-forming composition may comprise one or more antiblocking and/or detackifying agents. Non-limiting examples of suitable antiblocking and/or detackifying agents include starches, modified starches, crosslinked polyvinylpyrrolidone, crosslinked cellulose, microcrystalline cellulose, silica, metallic oxides, calcium carbonate, talc and mica.

Active agents of the present invention may be added to the filament-forming composition prior to and/or during fibrous element formation and/or may be added to the fibrous element after fibrous element formation. For example, a perfume active agent may be applied to the fibrous element and/or fibrous structure comprising the fibrous element after the fibrous element and/or fibrous structure according to the present invention are formed. In another example, an enzyme active agent may be applied to the fibrous element and/or fibrous structure comprising the fibrous element after the fibrous element and/or fibrous structure according to the present invention are formed. In still another example, one or more particles, which may not be suitable for passing through the spinning process for making the fibrous element, may be applied to the fibrous element and/or fibrous structure comprising the fibrous element after the fibrous element and/or fibrous structure according to the present invention are formed.

G. Extensional Aids

In one example, the fibrous element comprises art extensional aid. Non-limiting examples of extensional aids can include polymers, other extensional aids, and combinations thereof. High molecular weight extensional aids can be used since they have the ability to increase extensional melt viscosity and reduce melt fracture.

The extensional aid, when used in a meltblowing process, is added to the composition of the present invention in an amount effective to visibly reduce the melt fracture and capillary breakage of fibers during the spinning process such that substantially continuous fibers having relatively consistent diameter can be melt spun. The extensional aids can be present from about 0.001% to about 10%, by weight on a dry fibrous element basis and/or dry particle basis and/or dry fibrous structure basis, in one example, and in another example from about 0.005 to about 5%, by weight on a dry fibrous element basis and/or dry particle basis and/or dry fibrous structure basis, in yet another example from about 0.01 to about 1%, by weight on a dry fibrous element basis and/or dry particle basis and/or dry fibrous structure basis, and in another example from about 0.05% to about 0.5%, by weight on a dry fibrous element basis and/or dry particle basis and/or dry fibrous structure basis.

Non-limiting examples of polymers that can be used as extensional aids can include alginates, carrageenans, pectin, chitin, guar gum, xanthum gum, agar, gum arabic, karaya gum, tragacanth gum, locust bean gum, alkylcellulose, hydroxyalkylcellulose, carboxyalkylcellulose, and mixtures thereof. Nonlimiting examples of other extensional aids can include modified and unmodified polyacrylamide, polyacrylic acid, polymethacrylic acid, polyvinyl alcohol, polyvinylacetate, polyvinylpyrrolidone, polyethylene vinyl acetate, polyethyleneimine, polyamides, polyalkylene oxides including polyethylene oxide, polypropylene oxide, polyethylenepropylene oxide, and mixtures thereof.

H. Method for Making Fibrous Elements and Plies

Figure 3:
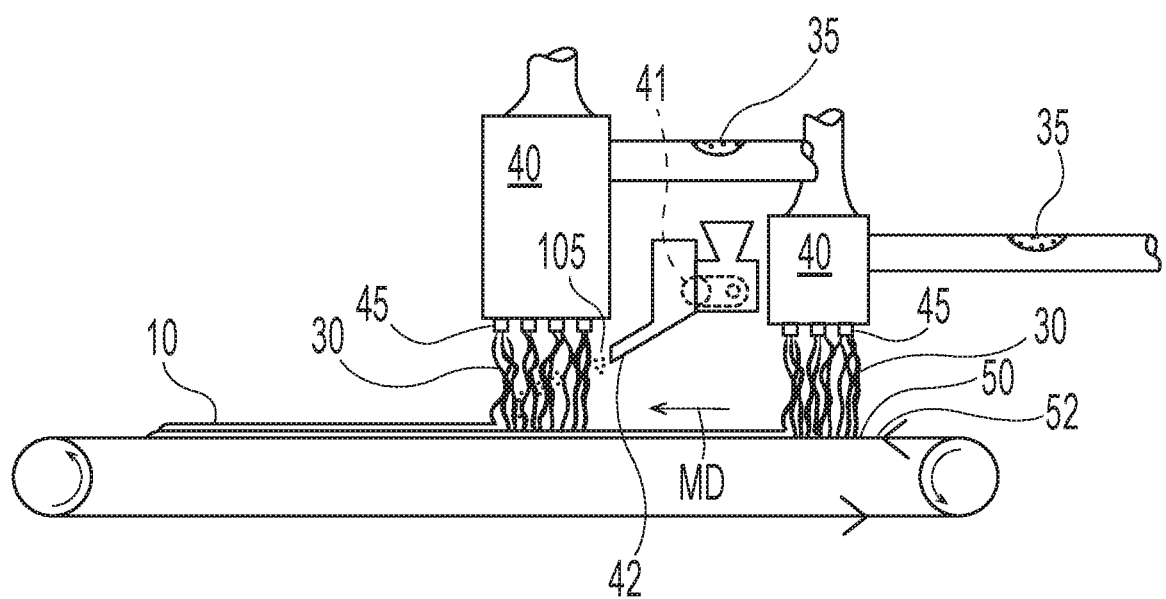
FIG. 3 a process for making plies of material.

The fibrous elements 30 and plies formed therefrom may be made by any suitable process. A non-limiting example of a suitable process for making the plies and continuous ply webs is shown in FIG. 3. A solution of a filament forming composition 35 is provided. The filament forming composition can comprise one or more filament forming materials and optionally one or more active agents. The filament forming composition 35 is passed through one or more (lie block assemblies 40 comprising a plurality of spinnerets 45 to form a plurality of fibrous elements 30 comprising the one or more filament forming materials and optionally one or more active agents. Multiple die block assemblies 40 can be employed to spin different layers of fibrous elements 30, with the fibrous elements 30 of different layers having a composition that differ from one another or are the same as one another. That is, the filament forming composition 35 provided to one die block assembly 40 can differ compositionally from the filament forming composition 35 provided to another die block assembly 40. More than two die block assemblies in series can be provided to for three, four, or any other integer number of layers in a given ply.

The fibrous elements 30 can be deposited on a belt 50 moving in a machine direction MD to form a parent continuous ply web 59. The belt 50 can be a foraminous belt. Belts 50 that are air permeable are desirable so that vacuum can be applied to and through the belt. The belt 50 can be a XBE2A9 belt available from F.N. Sheppard & Co. Erlanger, Ky., USA. The belt 50 can be formed from polyester strands or other polymeric strands. It is desirable that the belt 50 have small openings so that the web carried thereon is not deformed into the openings. The belt 50 can be coated to lower the surface tension of the belt 50 with respect to the web carried thereon. The belt 50 can move at a speed from about 1 m/min to about 100 m/min, optionally about 2 m/min to about 30 m/min.

The motive force to move the continuous ply webs disclosed herein may be provide by one or more belts 50. As the belt 50 moves the continuous ply webs ride directly or indirectly through another material, for example another continuous ply web, on the belt 50. For locations at which the continuous ply web are not in contact with a belt 50, tensile force mobilized in the continuous ply web downstream of the location at which the continuous ply web loses contact with the belt 50 can pull the continuous ply web along. Tension in the continuous ply web 59 should be maintained at an acceptably low level to preserve the function and aesthetic integrity of the material. Optionally, when a continuous ply web is off of the belt, motive force can be provided by motorized rollers.

The spinnerets 45 may comprise a plurality of fibrous element-forming holes that include a melt capillary encircled by a concentric attenuation fluid hole through which a fluid, such as air at a temperature from about 10 C to about 100 C, can pass to facilitate attenuation of the filament-forming composition 35 into a fibrous element 30 as it exits the fibrous element-forming hole. The filament-forming composition can be provided to the fibrous-element forming hole at a rate of about 0.1 to about 2 g/min per hole, which can be set based on the composition of the filament-forming composition.

During the spinning step, volatile solvent, such as water, present in the filament-forming composition 35 can be removed, such as by drying, as the fibrous element 30 is formed. Greater than 30% and/or greater than 40% and/or greater than 50%, and/or greater than 60% of the weight of the filament-forming composition's volatile solvent, such as water, can be removed during the spinning step, such as by drying the fibrous element being produced.

The filament-forming composition 35 is spun into one or more fibrous elements 30 and/or particles by any suitable spinning process, such as meltblowing, spunbonding, electro-spinning, and/or rotary spinning. In one example, the filament-forming composition is spun into a plurality of fibrous elements 30 and/or particles by meltblowing. For example, the filament-forming composition 35 may be pumped from a tank to a meltblown spinnerette 45. Upon exiting one or more of the filament-forming holes in the spinnerette 45, the filament-forming composition 35 is attenuated with air to create one or more fibrous elements 30 and/or particles. The fibrous elements 30 and/or particles may then be dried to remove any remaining solvent used for spinning, such as the water.

The fibrous elements 30 and/or particles of the present invention may be collected on a belt 50, such as a patterned belt or flat belt, to form a fibrous structure comprising the fibrous elements 30 and/or particles that are directed into the fibrous elements 30.

Particles can be introduced into the stream of the fibrous elements 30 between the die block assembly 40 and the belt 50. Particles 95 can be fed from a particle receiver onto a belt feeder 41 or optionally a screw feeder. The belt feeder 41 can be set and controlled to deliver the desired mass of particles into the process. The belt feeder can feed an air knife 42 that suspends and directs the particles in an air stream into the fibrous elements 30 to form a mixture of comingled fibrous elements 30 and particles that are subsequently deposited on the belt 50. Optionally, the particles can be homogeneously distributed in a ply or a layer of layer of a ply. The particles can be homogeneously distributed in the cross direction of the parent continuous ply web. Optionally, particles can be introduced after the fibrous elements 30 are deposited on the belt 50. Optionally, the particles can be introduced by gravity and or optionally in between streams of filament-forming composition. An air laid forming head or sifter can be used to introduce the particles.

Multi-layer plies can be formed by providing two die block assemblies 40, one die block assembly 40 downstream of another die block assembly 40, by way of nonlimiting example as shown in FIG. 3.

A pressurized tank suitable for batch operation can be filled with a suitable filament-forming composition 35 for spinning. A pump, such as a ZENITH, type PEP H, having a capacity of 5.0 cubic centimeters per revolution (cc/rev), manufactured by Parker Hannifin Corporation, Zenith Pumps division, of Sanford, N.C., USA may be used to facilitate transport of the filament-forming composition 35 to the spinnerets 45.

The die block assembly 40 can have several rows of circular extrusion nozzles (fibrous element-forming holes) spaced from one another at a pitch P of about 1.524 millimeters. The nozzles can have individual inner diameters of about 0.305 millimeters and individual outside diameters of about 0.813 millimeters. Each individual nozzle can be encircled by an annular and divergently flared orifice (concentric attenuation fluid hole to supply attenuation air to each individual melt capillary). The filament-forming composition 35 extruded through the nozzles can be surrounded and attenuated by generally cylindrical, humidified air streams supplied through the orifices.

Attenuation air can be provided by heating compressed air from a source by an electrical-resistance heater, for example, a heater manufactured by Chromalox, Division of Emerson Electric, of Pittsburgh, Pa., USA. An appropriate quantity of steam can be added to saturate or nearly saturate the heated air at the conditions in the electrically heated, thermostatically controlled delivery pipe. Condensate can be removed in an electrically heated, thermostatically controlled, separator.

The embryonic fibrous elements 30 can be dried by a drying air stream having a temperature from about 149 C to about 315 C by an electrical resistance heater supplied through drying nozzles and discharged at an angle of about 90 degrees or less relative to the general orientation of the non-thermoplastic embryonic fibers being extruded. The dried embryonic fibrous elements 30 can be collected on a collection device, such as a movable foraminous belt, patterned collection belt, or flat belt. The addition of a vacuum source directly under the formation zone may be used to aid collection of the fibers.

II. Process for Manufacturing a Water Soluble Product

By joined it is meant that the elements are attached or connected directly to one another or are attached or connected to one another indirectly through one or more intermediate elements that are attached or connected to the elements being referred to as joined.

Figure 4:
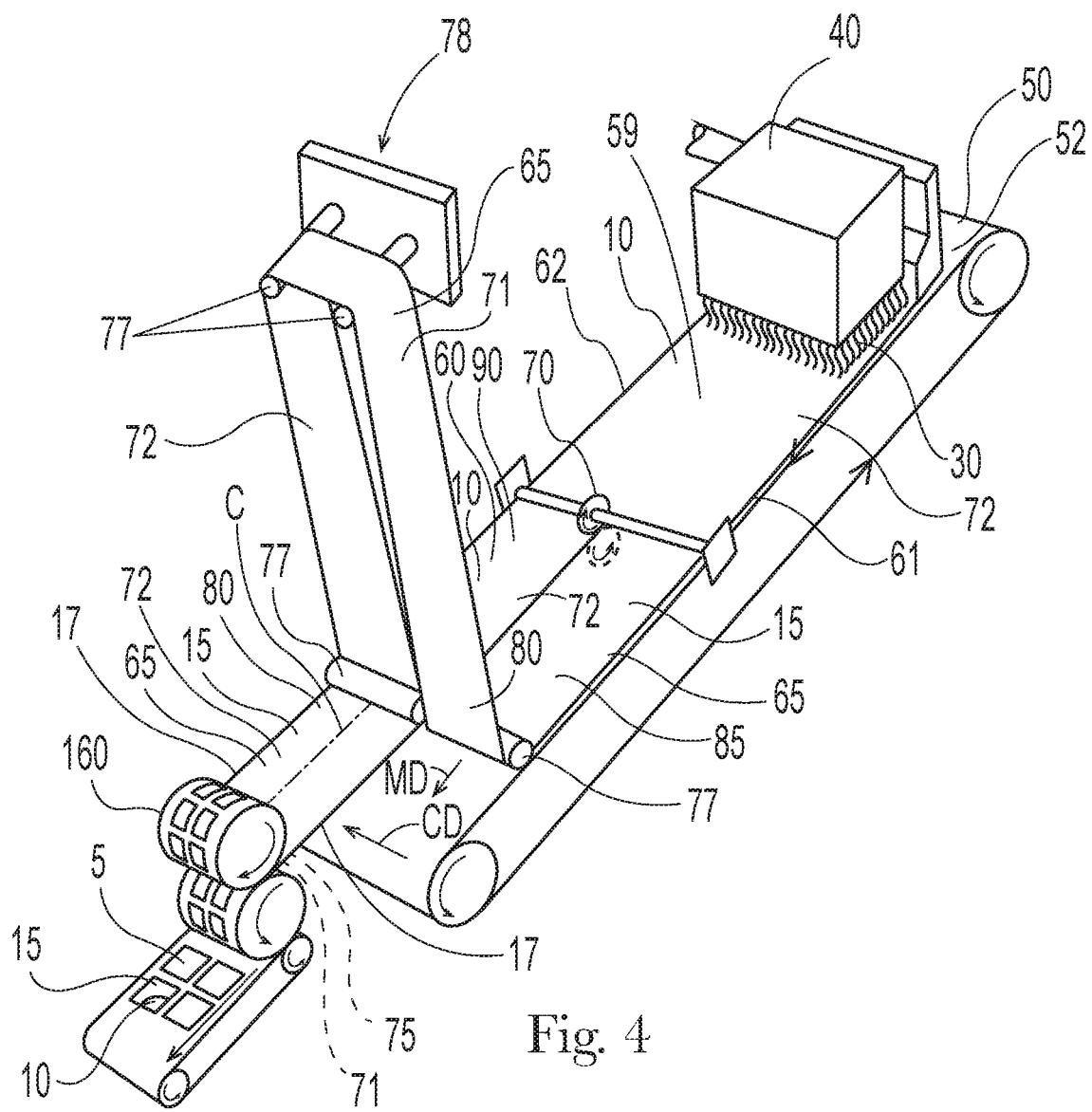
FIG. 4 is a manufacturing line for making a two-ply product.

The process for manufacturing a water soluble product 5 can comprise the following steps, as illustrated in FIG. 4, by way of non-limiting example. Water soluble fibrous parent continuous ply web 59 can be provided. The parent continuous ply web 59 can have a machine direction MD and a cross direction CD orthogonal to the machine direction. The parent continuous ply web 59 can have a thickness in a direction orthogonal to a plane defined by the machine direction MD and the cross direction CD. The parent continuous ply web 59 can extend in the cross direction CD between an operator edge 61 and a drive edge 62. Further, the parent continuous ply web 59 can be thicker between the operator edge 61 and the drive edge 62 than at the operator edge 61 and the drive edge 62.

The parent continuous ply web 59 can be cut, for example by a knife 70, in the machine direction MD to provide a first continuous ply web 60 that includes the drive edge 62 and a second continuous ply web 65 that includes the operator edge 61. By operator edge 61 it is meant the edge of the parent continuous ply web 59 that is on one side of the centerline of the parent continuous ply web 59, the centerline of the parent continuous ply web 59 being in the machine direction. The drive edge 62 is on the opposite side of the centerline than the operator edge 61. The operator edge 61 can be the edge of the continuous ply web 59 that is oriented towards a person responsible for operating, accessing, and or maintaining the converting apparatus. For convenience and accessibility, motors, frames, hangers, and the like may be present on the side of the converting apparatus towards which the drive edge 62 is oriented.

FIG. 4 is a nonlimiting example of how a two-ply product 5 can be formed. First continuous ply web 60 and the second continuous ply web 65 can be superposed to superpose what ultimately becomes the lower ply 10 and the upper ply 15 in a product 5. At this stage of the process, what ultimately becomes the individual water soluble products 5 can be part of a continuous multi-ply web. There can be intermingling of fibers constituting the plies. This may occur when the plies forming the product 5 are brought into contact with one another and or bonded to one another.

It can be practical to spin a first continuous ply web 60 having a width from about 20 cm to about 500 cm, or from about 20 cm to about 100 cm, or from about 20 cm to about 80 cm, or from about 40 cm to about 70 cm, or about 60 cm. Such a first continuous ply web 60 can be cut in the machine direction to form multiple plies that can be stacked form one or more products 5 in on or more lanes of product 5 production. For instance, it can be practical to provide a first continuous ply web 60 that is about 60 cm wide and cut it into three continuous plies each having a width of about 20 cm, stack those three continuous plies, join those three plies together, to form two or more products 5 in the cross direction CD.

In FIG. 4, product 5 making reduces down to a single lane with the potential for making multiple products 5 in the cross direction CD.

The superposed first continuous ply web 60 and second continuous ply web 65 can be joined to one another and cut to form the water soluble product 5. A first portion 11 of the lower ply 10 can be joined to a second portion 16 of the upper ply 15 to the water soluble product 5.

The parent continuous ply web 59 can be supplied as a parent roll of material. It can be practical to employ a continuous process from formation of the parent continuous ply web 59 to finished product 5 because it can be challenging to handle and store water soluble fibrous webs.

The second continuous ply web 65 can be cut in the machine direction MD from the parent continuous ply web 59. For instance, the parent continuous ply web 59 can be formed on a die block assembly 40 and then cut in the machine direction MD by a knife 70, as shown in FIG. 4, for instance a rotary cutting knife that cuts in the machine direction MD. Cutting ply webs from the parent continuous ply web 59 can be practical for providing better manufacturing quality control since only a single die block assembly must be controlled and control ends up being universally applied to each continuous ply web. This contrasts to the situation in which one die block is used to form one continuous ply web and another die block is used to form another continuous ply web and both die blocks must be carefully monitored and controlled. Also, such an arrangement can be helpful for minimizing trimming waste that might be required for edges of the ply web that are too thin to employ in making products 5. Thin edges of the continuous ply webs can result in the need to process and handle continuous ply webs and products 5 that have a nonuniform caliper, for instance by trimming edges having reduced caliper or paying careful attention to the orientation in which plies are superposed to form a product 5.

The first continuous ply web 60 and the second continuous ply web 65 can be superposed to form a web stack 66 so that the operator edge 61 and the drive edge 62 of what was formerly the parent continuous ply web 59 are on opposite sides of a centerline C of the web stack 66 in the machine direction MD. When the continuous ply webs are superposed to form the web stack 66, there can be intermingling of the fibers constituting the continuous ply webs.

Since the operator edge 61 and drive edge 62 may be thinner than the parent continuous ply web 59 between the operator edge 61 and the drive edge 62, forming the web stack 66 so that the operator edge 61 and drive edge 62 are on opposite sides of a centerline C of the web stack 66 can help to provide for web stack 66 that has a more uniform thickness across the cross direction CD than if relatively thin operator edge 61 and drive edge 62 were on the same side of the centerline C of the web stack 66. Further, arranging the operator edge 61 and drive edge 62 as such can help to provide lateral edges 17 of the web stack 66 that have the same or roughly similar amounts of web material proximal the lateral edges 17, which can simplify design and control of the bonding apparatus used to bond multiple plies or continuous ply webs together with one another. Further, arranging the operator edge 61 and drive edge 62 to be on opposite sides of the centerline C avoids having one lateral edge 17 of the web stack thinner or substantially thinner than portions of the web stack 66 away from that lateral edge 17. If the operator edge 61 and drive edge 62 are on the same side of the centerline C, the web stack may have a nonuniform thickness at different locations in the cross direction CD of the web stack 66. Further, the finished product 5 formed from the portion of the web stack 66 proximal a lateral edge 17 may have a nonuniform thickness at different locations in the cross direction CD. Web handling, bonding, and cutting may be more complicated if the thickness of the web stack 66 varies at different locations in the cross direction CD.

Optionally, the parent continuous ply web 59 may be a trimmed continuous ply web. That is a continuous ply web may be laid down on a belt 50. The extremities of the continuous ply web in the cross direction 50 may be too thin, have loose fibrous element 30, have bended fibrous elements 30, and have an irregularly shaped edge that make these extremities unsuitable to include in a product 5. These extremities may be trimmed off. Even with these extremities being trimmed from the continuous ply web, the remaining parent continuous ply web 59 may have an operator edge 61 and drive edge 62 that are thinner than the parent continuous ply web 59 between the operator edge 61 and drive edge 62. The idea is to maximize the breadth in the cross direction CD of the parent continuous ply web 59 that is used to form products 5 since the raw materials and energy used to form the parent continuous ply web 59 may account for a substantial fraction of the cost of making products 5. Trimming may be minimized to the smallest amount possible so that the remainder of the web that forms the parent continuous ply web 59 is structurally stable and performs competently. Even when this is accomplished, the operator edge 61 and drive edge 62 may still be thinner than portions of the parent continuous ply web 59 closer to the centerline of the parent continuous ply web 59.

There may be one or more additional continuous ply webs or one or more plies of material above or below the web stack 66 or in between the continuous ply webs. There can be intermingling of the fibers of a ply with a ply immediately next to that ply.

Portions of the web stack 66 can be cut and joined to form the water soluble product 5. The step of joining portions of the web stack 66 can be done before, during, or after cutting portions of the web stack 66. For example, the first continuous ply web 60 and the second continuous ply web 65 can be joined to one another at a stage of the process during which the portions being joined are still connected to the upstream continuous ply webs. Optionally, the web stack 66 can be cut into the precursor parts of the product 5 and the precursor parts can be joined to one another to form the finished product 5. Further optionally, the cutting and joining of portions of the web stack 66 to form the product 5 may occur simultaneously. Regardless of whether the step of joining portions of the web stack 66 is done before, during, or after a step in which the part of the web stack 66 that will ultimately form a product 5 is separated from the upstream continuous ply webs, the step of cutting and joining portions of the web stack 66 to form the water soluble product 5 is defined to encompass at least each of these possible orders of operation for this step in forming a product 5, regardless of the number of continuous ply webs forming the web stack 66 (e.g. first continuous ply web 60, second continuous ply web 65, and third continuous ply web if present).

The first continuous ply web 60, second continuous ply web, 65, and third continuous ply web, if present, can be considered to have a belt side 71 and an opposing air side 72. The belt side 71 of the first continuous ply web 60 can be considered as the first continuous ply web belt side 75. Similarly, the belt side 71 of the second continuous ply web 65 can be considered as the second continuous ply web belt side 80. And the belt side 71 of the third continuous ply web if present can be considered as the third continuous ply web belt side. The belt side is the side of the parent continuous ply web 59 or any continuous ply web that was formed against a surface 52 or belt 50. The first continuous ply web 60 can be considered to have a first continuous ply web air side 90 opposite the first continuous ply web belt side 75. And the second continuous ply web 65 can be considered to have a second continuous ply web air side 85 opposite the second continuous ply web belt side 80. The air side of a continuous ply web is the free side of the continuous ply web exposed to the atmosphere at least immediately after such continuous ply web is completely formed.

The process can further comprise a step of superposing the first continuous ply web 60 and second continuous ply web 65 so that the operator edge 61 and drive edge 62 are on opposite sides of a centerline C of the web stack 66 in the machine direction MD. The aforesaid continuous ply webs can be superposed by lifting one of the aforesaid continuous ply webs and placing it on the other continuous ply web. This can be accomplished by using a system of turning bars 77, or other implement known in the art, including but not limited to a shaped surface that can steer a continuous ply web to be above or below another continuous ply web.

The turning bars 77 may be static polished metal turning bars 77 or may be turning bars 77 that rotate about an axis driven by a motor or the drag force of the continuous ply web passing the turning bars 77, such as a roller. The turning bars 77 may be polished metal turning bars 77 to permit the continuous ply web to slide over the turning bars 77 with inconsequential drag force from the turning bars 77 so that the continuous ply web is not stretched more than is tolerable.

The belt side 71 and air side 72 of the continuous ply webs can have a difference in surface texture. The belt side of a ply or continuous ply web is the side of the ply or continuous ply web that was formed in contact with the belt 50 upon which the fibrous elements 30 were deposited. That is, the belt side of a ply or continuous ply web can be the side of ply or continuous ply web facing and in contact with the belt 50 upon which fibrous elements 30 were deposited. The belt side 71 can tend to have a flatter surface profile than the air side since the fibrous elements 30 may conform or partially conform to the surface 52 of the belt 50 on which the fibrous elements 30 land. The air side has no constraining surface. Absent post deposition processing, the air side 72 of the plies may tend to be fluffier or loftier, possibly less coherent, than the belt side 71. Providing products 5 that have the belt sides 71 of the plies facing outwardly can be practical for presenting the smoother surfaces of the plies outwardly for subsequent printing, better tactile feel and look, and better ability to contain particles. Also, if multilayer plies are provided, plies containing particles can confined to the interior of the product 5 so that the user does not have or has limited contact with the particles, which may comprise active agents.

Figure 5:
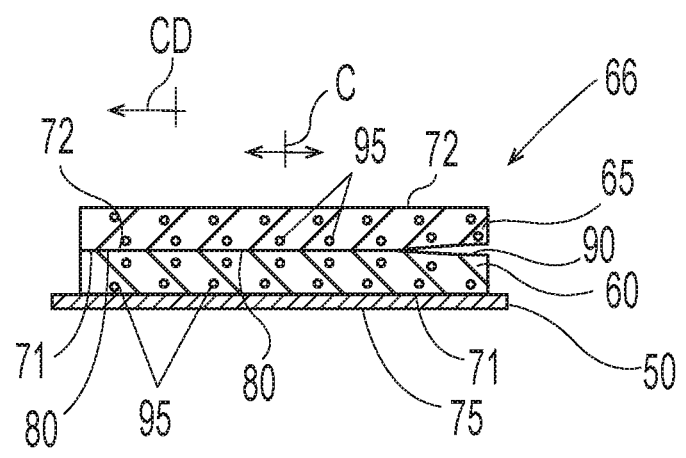
FIG. 5 is a cross section view of a web stack in which the continuous ply webs include particles.

One or more of the continuous ply webs may be provided with particles comprising one or more active agents, by way of nonlimiting example as shown in FIG. 5. For instance, the first continuous ply web 60 can be provided with a plurality of water soluble particles 95. Similarly, the second continuous ply web 65 can be provided with a plurality of water soluble particles 95.

The process of manufacturing described herein may be conveniently employed fabricate products 5 having multiple plies and optionally multilayer plies forming one or more of the multiple plies. Multiple plies and multilayer plies enable the manufacturer to provide for different product benefits in each ply or layer, active agents away from the layers forming the outer surface of the products 5, surfaces that are convenient to print upon, and products 5 that are pleasant to touch.

Figure 6:
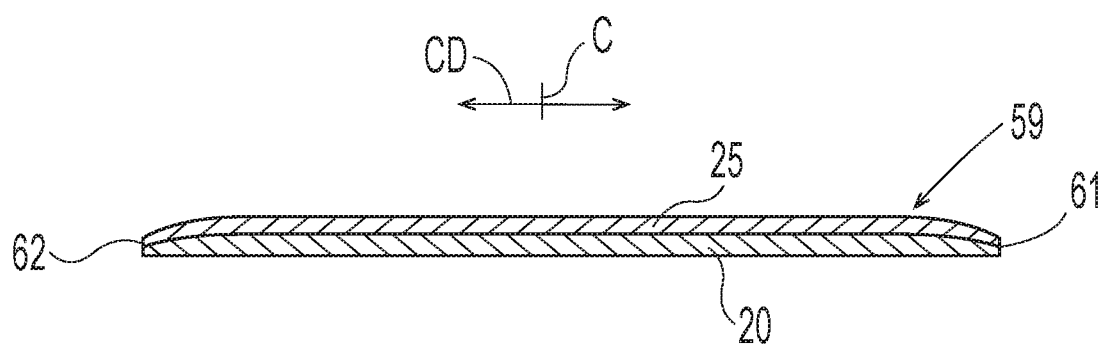
FIG. 6 is a cross section view of a multilayer parent continuous ply web.

The process of manufacturing described herein can further comprise the steps of providing a fibrous first layer 20 and providing a fibrous second layer 25 facing, or in facing relationship, or in facing and contacting relationship, with the fibrous first layer 20. Together, the fibrous first layer 20 and fibrous second layer 25 can form the parent continuous ply web 59, for instance as shown in FIG. 6. The parent continuous ply web 59 can comprise a fibrous first layer 20 and a fibrous second layer 25 facing the fibrous first layer 20. The fibrous first layer 20 and fibrous second layer 20 can together form the parent continuous ply web 59. Said otherwise, the process described herein can further comprise the steps of providing a fibrous first layer 20 and providing a fibrous second layer 25 facing the fibrous first layer 20, the fibrous first layer 20 and fibrous second layer 25 together forming the parent continuous ply web 59. There can be intermingling of fibers constituting the first layer 10 and fibers constituting the second layer 25.

Figure 7:
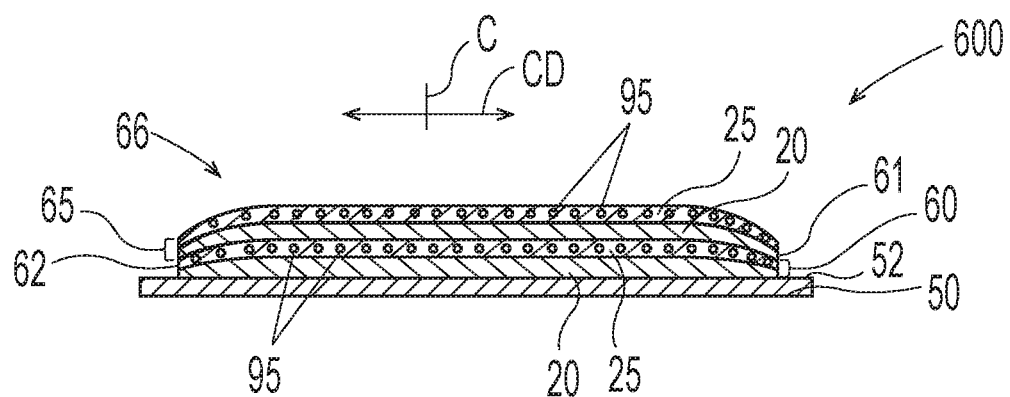
FIG. 7 is a cross section view of a web stack in which the parent continuous ply web is a multilayer continuous ply web.

A multilayer continuous ply web 59 can be cut in the machine direction MD and stacked in the manner shown in FIG. 4 to form a web stack 66. A web stack 66 in which the parent continuous ply web 59 is a multilayer continuous ply web 59 is shown in FIG. 7. As shown in FIG. 7, the first continuous ply web 60 can comprises fibrous first layer 20 and a fibrous second layer 25. The first layer 20 and the second layer 25 can together form the first continuous ply web 60. Similarly, the second continuous ply web 65 can comprise the fibrous first layer 20 and the fibrous second layer 25. And the operator edge 61 and the drive edge 62 can be on opposite sides of the centerline C of the web stack 66 in the machine direction MD. The fibrous second layer 25 of the first continuous ply web 60 and the fibrous second layer 25 of the second continuous ply web 65 can be in facing and contacting relationship with one another.

The parent continuous ply web 59 can be provided with a plurality of water soluble particles 95. Multilayer plies can be formed in the manner shown in FIG. 3. The water soluble particles 95 can be provided to the first layer 20 and or second layer 25 of the parent continuous ply web 59. In the web stack 66 shown in FIG. 7, the water soluble particles 95 are provided in the second layer 25 of the parent continuous ply web 59. It can be practical to provide the water soluble particles 95 in the second layer 25 rather than the first layer 20 to provide for a cleaner manufacturing operation. If water soluble particles 95 are directed into the fibrous elements 30 that form the first layer 20, some of the water soluble particles 95 potentially could end up on or even build up on the belt 50, which might necessitate regular cleaning which could reduce productivity.

If a multilayer continuous ply web 59 is employed, the first continuous ply web belt side 75, second continuous ply web belt side 80, and third continuous ply web belt side 525 if present, can comprise the first layer 20. Water soluble particles 95 can be provide to the second layer as or before the fibrous elements 30 forming the second layer 25 are deposited on the first layer 20. This arrangement for a multilayer structure for a continuous ply web and particles can be convenient since the first layer 20 can act as a separation layer between the belt side 71 of the continuous ply web and the particles 95. So when the continuous ply web 59 is ultimately cut and stacked to form a product 5, what was formerly the belt side 71 of the continuous ply web 59 can form the outer surface or surfaces of the product 5.

Providing a multilayer continuous ply web 59 can tend to enhance the stiffness of the product 5. Further, a multilayer continuous ply web 59 can enable the product designer to place active agents in chosen layers of the plies, optionally provide for different active agents in different layers of the plies, and optionally place active agents between the layers and or plies.

Multilayer continuous ply webs can be formed as illustrated in FIG. 3, by way of nonlimiting example. And optionally, water soluble particles 95 can be introduced as described herein.

The first layer 20 can have a basis weight from about 20 gsm to about 500 gsm, optionally about 40 gsm to about 100 gsm, optionally about 50 gsm to 80 gsm, according to the Basis Weight Test Method. The second layer 25 can have a basis weight from about 20 gsm to about 500 gsm, optionally about 40 gsm to about 300 gsm, optionally about 200 gsm, according to the Basis Weight Test Method.

Any embodiments contemplated herein, the first continuous ply web 60 and second continuous ply web 65, and third continuous ply web (if present) can have a basis weight from about 100 gsm to about 800 gsm, optionally from about 150 gsm to about 500 gsm, optionally about 200 gsm to about 300 gsm, according to the Basis Weight Test Method.

To provide for products 5 having surfaces that are easy to print upon and are pleasant to touch, it can be practical to have the belt side 71 of the continuous ply webs forming the outer surface of the product 5. For multilayer plies, this arrangement can provide a benefit of positioning the water soluble particles 95 towards the interior of the product 5 and remote from being in contact with the consumer's hand as the product is handled.

Figure 8:
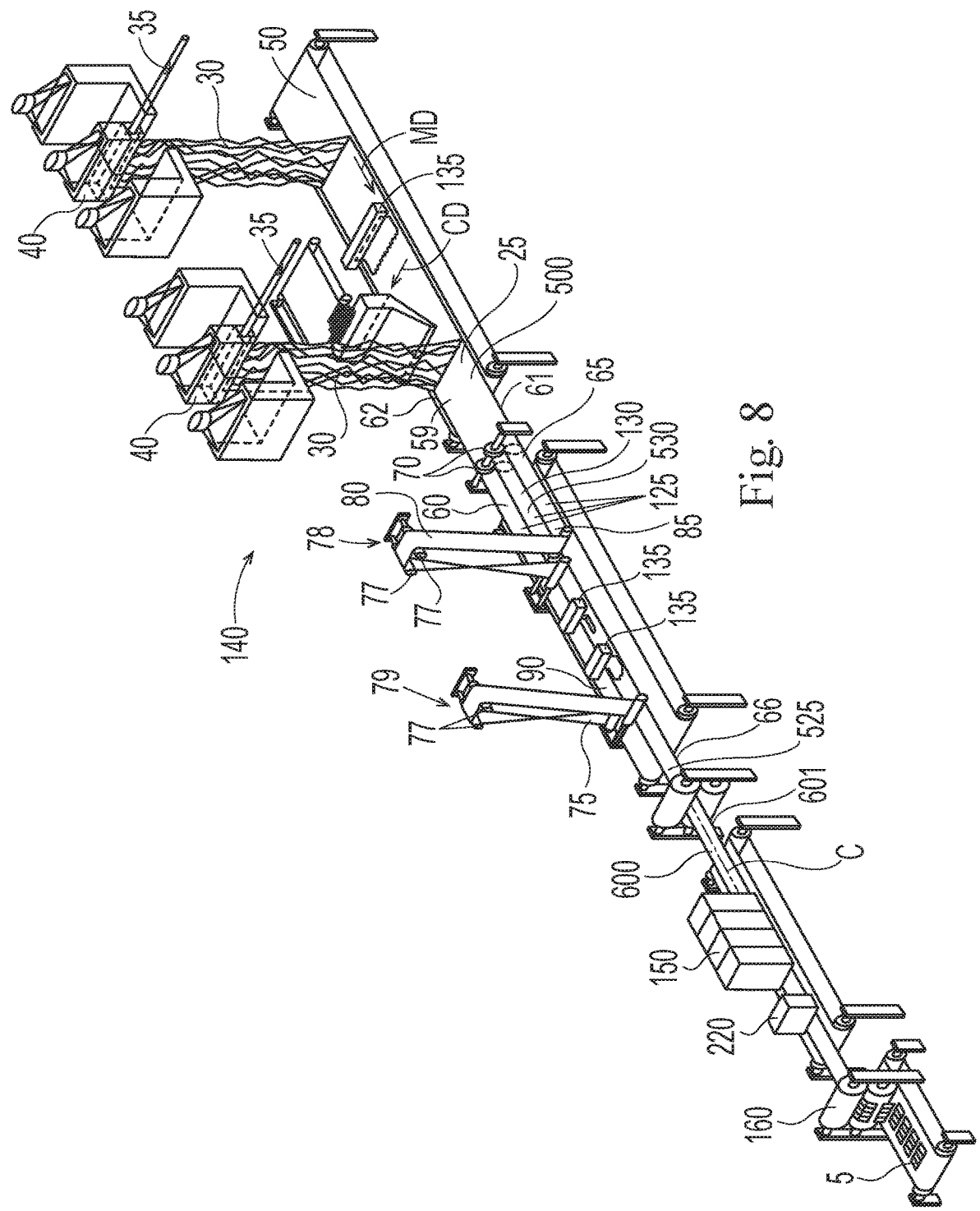
FIG. 8 is manufacturing line for making a three-ply product.

A three-ply product 5 can also be practical. A nonlimiting example of the process to make a three-ply product 5 in a continuous process is shown in FIG. 8. The continuous process can be uninterrupted from the step of providing the filament forming composition 35 to formation of the water soluble products 5, whether the water soluble products 5 exist as a part of a web of a plurality of water soluble products 5 joined to one another or are discrete water soluble products 5 separated from one another. A benefit of a continuous process is that the plies or continuous ply webs do not need to be stored before converting such materials into water soluble products 5. Storage of plies or continuous ply webs that are water soluble can require undue attention to temperature, humidity, and gentle handling to preserve the integrity of such materials. By continuous process, it is meant that the steps of the process occur in on a continuous manufacturing line.

At the upstream end of the process, a filament forming composition 35 can be provided. The filament forming composition can passed through a die block assembly 40 comprising a plurality of spinnerets 45 to form a plurality of fibrous elements 30. The fibrous elements 30 can be deposited on a belt 50 moving in a machine direction to form a first layer 20. The first layer 20 can then pass beneath another die block assembly 40 from which a filament forming composition 35 is exiting through a plurality of spinnerets 45 to form a plurality of fibrous elements 30. Particles can be inserted into the stream of fibrous elements 30. The fibrous elements 30 and particles can be laid on top of the first layer 20 in a second layer 25. Together, the first layer 20 and second layer 25 can form the parent continuous ply web 59.

The parent continuous ply web 59 can be cut in the machine direction MD into three lanes 125 of continuous ply webs. The center lane can be the third continuous ply web 13. The outer lanes 125 can be the first continuous ply web 60 and second continuous ply web 65. One or more active agent applicators 135 can apply one or more active agents to the second layer 25.

The process can further comprise the step of cutting from the parent continuous ply web 59 in the machine direction MD a third continuous ply web 130 between the first continuous ply web 60 and the second continuous ply web 65 in the cross direction CD. The process can further comprise the step of superposing the third continuous ply web 130 with the first continuous ply web 60 and the second continuous ply web 65 to form the web stack 66.

The second continuous ply web 65 can be positioned between the first continuous ply web 60 and the third continuous ply web 130. Optionally, the first continuous ply web 60 can be positioned between the second continuous ply web 65 and the third continuous ply web 130. The steps of stacking the various continuous ply web can be accomplished with a series of turning bars 77. The third ply of a product 5 can be provided as part of a third continuous ply web 130. Conveniently, the third continuous ply web 130 can be cut in the machine direction MD from the parent continuous ply web 59. For instance, a parent continuous ply web 59 can be provided by depositing fibrous elements 30 onto a belt 50. Optionally, water soluble particles 95 can be introduced into the stream of fibrous elements 30 between the die block assembly 40 and the belt 50. Further optionally, water soluble particles 95 can be introduced onto the air side of the parent continuous ply web 59. The first continuous ply web 60, second continuous ply web 65 and the third continuous ply web 130 can be cut from in the machine direction MD from the parent continuous ply web 59. A third continuous ply web 130 is considered to be cut in the machine direction MD from the parent continuous ply web 59 if it is cut in the machine direction MD directly from the parent continuous ply web 59 or cut in the machine direction MD from an intermediate continuous ply web after one of the first continuous ply web 60 or second continuous ply web 65 are cut in the machine direction MD from parent continuous ply web 59. For instance, cutting the various continuous ply webs from the parent continuous ply web 59 may occur in multiple steps along the machine direction MD of the processing apparatus. One of the first continuous ply web 60 and second continuous ply web 65 may be cut in the machine direction MD from the parent continuous ply web 59 leaving a wide lane of continuous ply web. The wide lane of continuous ply web can be subsequently cut in the machine direction MD to form the remaining continuous ply webs. Prior to forming the web stack 66, the third continuous ply web 130 can be between in the cross direction CD the first continuous ply web 60 and second continuous ply web 65.

In one configuration of the process, three lanes 125 of separate continuous ply webs can be provided in the machine direction MD. The lanes of continuous ply webs may be in any order in the cross direction and web handling appurtenances may be used to lift individual continuous ply webs from the belt 50 and lay them onto another continuous ply web with either the belt side 71 or air side 72 facing up. Starting with a single parent continuous ply web 59 and cutting that continuous ply web to form the first continuous ply web 60, second continuous ply web 65, and third continuous ply web 130 can simplify manufacturing quality control since only a single die block assembly 40 and optionally a particle providing apparatus need to be monitored and controlled.

After superposing the first continuous ply web 60, second continuous ply web 65, and third continuous ply web 130, to form a web stack 66 such continuous ply webs can be cut to form the water soluble product 5. Optionally, the first continuous ply web 60 and the second continuous ply web 65 can first be joined to one another and then cut to form the water soluble product 5. Optionally, the step of joining two or more of the continuous ply webs and cutting such webs to form the water soluble product 5 can be combined in a single step. Further optionally, such continuous ply webs can be cut to provide the lower ply 10, upper ply 15, and interior ply 120, before joining two or more of such plies to form the water soluble product 5.

The parent continuous ply web 59 can be considered to have a parent continuous ply web belt side 71 and an opposing parent continuous ply web air side 72. The parent continuous ply web belt side 71 is the surface of the parent continuous ply web 59 formed on the belt 50. Cutting the parent continuous ply web into the first continuous ply web 60, the second continuous ply web 65, and third continuous ply web 130, yields each of these continuous ply webs to have a belt side 71 and an air side 72. So the first continuous ply web 60 can comprise a first continuous ply web belt side 75 and an opposing first continuous ply web air side 90. And the second continuous ply web 65 can comprise a second continuous ply web belt side 80 and an opposing second continuous ply web air side 85. And the third continuous ply web 130 can comprise a third continuous ply web belt side 525 and an opposing third continuous ply web air side 530. There can be intermingling of fibers constituting one ply with a ply next to that ply as the web stack is built and products are cut therefrom and bonded.

Once the continuous ply webs are stacked in the manner desired, the web stack 66 can be considered to have an upper facing surface 600 and an opposing lower facing surface 601. The lower facing surface 601 can be the downwardly oriented surface of the web stack. The lower facing surface 601 can be facing a belt, optionally the belt 50 or a belt downstream of the belt 50.

The process can further comprise a step of positioning the first continuous ply web 60, the second continuous ply web 65, and third continuous ply web 130 so that the upper facing surface 600 and the lower facing surface 601 are selected from the group consisting of the first continuous ply web belt side 75, the second continuous ply web belt side 80, and the third continuous ply web belt side 525, and the upper facing surface 600 is not the same as the lower facing surface 601.

It can be desirable for the upper facing surface 600 and lower facing surface of the web stack 66 to be a belt side 71 of the one of the continuous ply webs to provide externally facing sides of the web stack 66 that can be convenient to print upon before or after forming the products 5 and to provide for products 5 that are pleasant to touch. Further, if particles are provided in one of the plies, or between any of the plies, or between layers constituting any of the plies, presenting a belt side as an externally facing surface can help to isolate such particles from contacting the user of the product. Similarly, if active agents are provided in one of the plies, or between any of the plies, or between layers constituting any of the plies the same benefit can be achieved.

Like the two ply water soluble product 5 discussed above and for the same reasons as discussed above, when an interior ply is positioned between the lower ply 10 and upper ply 15 it can be practical for the process to further comprise the step of positioning the first continuous ply web belt side 75 and the second continuous ply web belt side 80 to face away from one another prior to joining portions of the lower ply 10 and upper ply 15 or joining portions of the first continuous ply web 60 and the second continuous ply web 65.

The process can further comprise the step of applying on or in one or more of the first continuous ply web 60, second continuous ply web 65, and third continuous ply web 130, and any layer of such ply (e.g. first layer 20, second layer 25, or any additional layer) on either or both the air side 72 or belt side 71 of such continuous ply web or between the upper facing surface 600 and the lower facing surface 601 of the web stack 66 or between the first continuous ply web 60 and the second continuous ply web 65 an active agent selected from the group consisting of unencapsulated perfume, encapsulated perfume, surfactant, enzyme, bleach, chelant, structurant, builder, organic polymeric compound, brightener, hueing agent, suds suppressor, conditioning agent, humectant, alkalinity system, pH control system, buffer alkanolamine, insect repellant, hair care agent, hair conditioning agent, skin care agent, sunscreen agent, skin conditioning agent, fabric softener, anti-wrinkling agent, anti-static agent, fabric care stain removal agent, soil release agent, dispersing agent, suds suppressing agent, suds boosting agent, anti-foam agent, fabric refreshing agent, dishwashing agent, hard surface care agent, antimicrobial agent, antibacterial agent, antifungal agent, bleach activating agent, chelating agent, builder, lotion, air care agent, carpet care agent, dye transfer-inhibiting agent, clay soil removing agent, anti-redeposition agent, polymeric soil release agent, polymeric dispersing agent, alkoxylated polyamine polymer, alkoxylated polycarboxylate polymer, amphilic graft copolymer, dissolution aid, buffering system, water-softening agent, water-hardening agent, pH adjusting agent, flocculating agent, effervescent agent, preservative, cosmetic agent, make-up removal agent, lathering agent, deposition aid agent, coacervate-forming agent, clay, thickening agent, latex, silica, drying agent, odor control agent, antiperspirant agent, cooling agent, warming agent, absorbent gel agent, anti-inflammatory agent, dye, pigment, acid, base, liquid treatment active agent, agricultural active agent, industrial active agent, ingestible active agent, medicinal agent, teeth whitening agent, tooth care agent, mouthwash agent, periodontal gum care agent, dietary agent, vitamin, minerals, water-treatment agent, water clarifying agent, water disinfecting agent, and mixtures thereof. The active agent may be provided as particles introduced into the stream for fibrous elements 30 discharged from any of the die block assemblies 40. The active agent may end up being positioned between plies of the product 5, embedded in one or more of the plies forming the product 5, or partially embedded in one or more of the plies forming the product 5.

During the process of manufacturing a product 5, the active agent may be deposited on the upper facing surface 600 of any ply or in any ply, or on and in any ply, or on the air side 72 of any continuous ply web, or in any continuous ply web by an active agent applicator 135. One or more active agent applicators 135 can be provided on the manufacturing line 140. An active agent applicator 135 can be a nozzle, extruder, sifter, printer, transfer roll, air atomized spray nozzle, hydraulically atomized spray nozzle, fluid applicator, extrusion applicator, hotmelt applicator, ink jet, flexographic printer, gravure printer, offset gravure, drop on demand ink jet, or any other device suitable for depositing an active agent onto a ply, especially a moving ply. Active agent applicators 135 can be positioned over any lane or any of the plies.

For reasons of practicality, active agents may be placed on or in or on and in the upwards facing side of any continuous ply web after the continuous ply web is positioned to have the desired side facing up. If an active agent is applied on or in or on and in a continuous ply web before the continuous ply web is finally placed in its vertical position of the product 5, the active agent might contact the turning bars 77. That could result poor web handling if active agent residue accumulates on the turning bars 77. For instance, as shown in FIG. 8, the active agent applicator 135 places active agent on the second continuous ply web 65 after the second continuous ply web 65 is positioned on top of the third continuous ply web 130. After the active agent is placed on the second continuous ply web 65, the first continuous ply web 60 can be place on top of the second continuous ply web 65 so that the second continuous ply web 65 is between the third continuous ply web 130 and the first continuous ply web 60. As such, when a three ply product 5 is employed, active agent can be conveniently provided on or in the second continuous ply web 65, on or in either surface of the second continuous ply web 65, and on or in the upper facing surface of the third continuous ply web 130. So, for a three ply product 5, multiple incompatible active agents can be conveniently separated from one another by the second ply.

The process can further comprise the step of providing a solution of filament-forming composition 35. The filament-forming composition 35 can be passed through one or more die block assemblies 40 comprising a plurality of spinnerets 45 to form a plurality of fibrous elements 30. The plurality of fibrous elements 30 can be deposited onto a belt 50 moving in a machine direction MD to form the parent continuous ply web 59. Optionally, multiple filament-forming compositions may be supplied to a single die block assembly 40 or portions thereof or multiple filament-forming compositions may be supplied to multiple die block assemblies 40.

The particles 95 can be introduced into the stream of fibrous elements 30 before the fibrous elements 30 are deposited onto a belt 50.

As shown in FIG. 8, the turning bars 77 can be provided at a first web handling station 78 and a second web handling station 79. The first web handling station 78 can be downstream of the die block assembly 40 and upstream of the second web handling station 79. The active agent applicator or applicators 135 can be positioned upstream of the first web handling station 78 and or between the first web handling station 78 and the second web handling station 79. The active agent applicator 135 can be positioned upstream of the first web handling station 79 and positioned to overlie the first continuous ply web 60. Optionally, the active agent applicator 135 can be positioned between the first web handling station 78 and the second web handling station 79 so that it overlies the second continuous ply web 65, the third continuous ply web 130 incidentally being beneath the second continuous ply web 65. Positioning the active applicator or applicators 135 as such permits the active agent to be positioned towards the interior of the finished product 5, reducing the potential for the consumer to contact the active agent.

The water soluble products 5 can be printed upon by one or more printing units 150. A printing unit 150 can be positioned anywhere on the manufacturing line so that the desired surface of one or more of the first continuous ply web 60, second continuous ply web 65, and or third continuous ply web 130, if present, can be printed upon. The printing can be CMYK printing. The printing can be laser jet, ink jet, gravure, pad, rotogravure, flexographic, offset, screen, lithographic, or any other printing approach suitable for printing webs of material, particularly process that are best suited for nonwoven materials. A drier 220 can be located downstream or upstream of the printing unit 150.

For a two ply water soluble products 5, the first continuous ply web 60 and second continuous ply web 65, or portions thereof, can be joined to one another, for instance by using a bonding roll, to form the water soluble product 5. If there is a continuous ply web between the third continuous ply web 130 and one of the first continuous ply web 60 or second continuous ply web 65, the outer plies of the water soluble product 5 can be bonded to one another and contain one or more of the plies between the outer plies. Optionally each of the plies forming the water soluble product 5 can be bonded to one another to provide for coherency of the water soluble product 5.

If there is an interior ply between the first ply 10 and the second ply 15, the interior ply can be contained within the first ply 10 and second ply 15. Optionally, the first ply 10 and second ply 15 can be joined to the interior ply so that the first ply 10 and second ply 15 are joined to one another through the interior ply 120.

Continuous ply webs can be bonded to one another by thermal bonding. Thermal bonding can be practical if the plies contain thermoplastic powder, optionally water soluble thermoplastic material. Thermal bonding can also be practical if the fibers constituting the plies are thermoplastic. Continuous ply webs can optionally be calendar bonded, point bonded, ultrasonically bonded, infrared bonded, through air bonded, needle punched, hydroentangled, melt bonded, adhesive bonded, or other known technical approach for bonding plies of material.

The water soluble products 5 can be separated from one another by a die cutter 160, optionally a rotary die cutter 160. A rotary die cutter 160 comprises a die roll and an anvil roll, the die roll and anvil rotating counter to one another.

The continuous ply webs can be bonded to one another and die cut in a single step using a reciprocating bonding and die cutting apparatus or a single rotary bonding and die cutting apparatus. In a rotary bonding and die cutting apparatus that combines the bonding and die cutting, the die is shaped to provide a die cut in which the material being cut is pinched between the knife-edge of the die and the smooth surface of the anvil. Further the die is shaped to compress portions of the plies, or continuous ply webs, and layers thereof together to bond the plies, continuous ply webs, and layers thereof to one another. The die can be a patterned die that provides a cutting and bonding pattern to the plies, continuous ply webs, and layers thereof. Optionally, the die can be heated, which might be practical for thermal bonding of the plies, continuous ply webs, and layers thereof.

Figure 9:
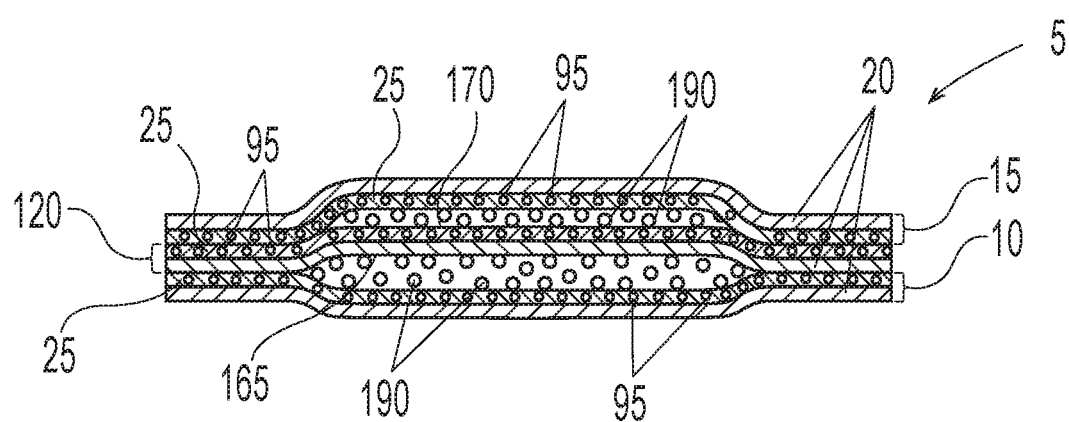
FIG. 9 is a cross section view of a three-ply product, each ply being a multilayer ply.

A three ply water soluble product 5 is shown in FIG. 9. Each of the plies can be a multi-layer ply. As shown in FIG. 9, the interior ply 120 can be between the lower ply 10 and upper ply 15. There can be intermingling of fibers of one ply with fibers of the ply next that ply. The interior ply 120 can be a single layer ply or a multi-layer ply. The interior ply 120 can have an interior ply belt side 165 and interior ply air side 170 opposite the interior ply belt side 165. Optionally, the interior ply 120 can comprise a plurality of particles 95. One or more active agents 190 can be between the interior ply 120 and the upper ply 15. The interior ply 120 can optionally be flipped relative to that shown in FIG. 9. Likewise, the plies can be arranged in any desired order in any desired orientation.

There can be any integer number greater than or equal to two of plies in a product 5. That may be accomplished by providing such number of plies or continuous ply webs and stacking such plies or continuous ply webs, inverting any of the plies or continuous ply webs as desired, and assembling such plies or continuous ply webs to for such products 5.

The processes disclosed here can be performed in a controlled environment. The processes can be performed in an environment in which the relative humidity is from about 15% to about 85%, optionally from about 30% to about 60%, optionally about 45%, and a temperature from about 15° C. to about 40° C., optionally about 15° C. to about 30° C., optionally about 18° C. to about 25° C., and any combination of the aforesaid ranges or values of relative humidity and temperature. Without being bound by theory, these ranges of relative humidity and temperature are thought to provide conditions in which plies can be manufactured and converted into finished products.

Diameter Test Method

The diameter of a discrete fibrous element or a fibrous element within a fibrous structure is determined by using a Scanning Electron Microscope (SEM) or an Optical Microscope and an image analysis software. A magnification of 200 to 10,000 times is chosen such that the fibrous elements are suitably enlarged for measurement. When using the SEM, the samples are sputtered with gold or a palladium compound to avoid electric charging and vibrations of the fibrous element in the electron beam. A manual procedure for determining the fibrous element diameters is used from the image (on monitor screen) taken with the SEM or the optical microscope. Using a mouse and a cursor tool, the edge of a randomly selected fibrous element is sought and then measured across its width (i.e., perpendicular to fibrous element direction at that point) to the other edge of the fibrous element. A scaled and calibrated image analysis tool provides the scaling get actual reading in mu m. For fibrous elements within a fibrous structure, several fibrous elements are randomly selected across the sample of the fibrous structure using the SEM or the optical microscope. At least two portions of the fibrous structure are cut and tested in this manner. Altogether at least 100 such measurements are made and then all data are recorded for statistical analysis. The recorded data are used to calculate average (mean) of the fibrous element diameters, standard deviation of the fibrous element diameters, and median of the fibrous element diameters. Another useful statistic is the calculation of the amount of the population of fibrous elements that is below a certain upper limit. To determine this statistic, the software is programmed to count how many results of the fibrous element diameters are below an upper limit and that count (divided by total number of data and multiplied by 100%) is reported in percent as percent below the upper limit, such as percent below 1 micrometer diameter or %-submicron, for example. We denote the measured diameter (in μm) of an individual circular fibrous element as $d_i$.

In the case that the fibrous elements have non-circular cross-sections, the measurement of the fibrous element diameter is determined as and set equal to the hydraulic diameter which is four times the cross-sectional area of the fibrous element divided by the perimeter of the cross-section of the fibrous element (outer perimeter in case of hollow fibrous elements). The number-average diameter, alternatively average diameter is calculated as:

$$d_{num} = \frac{\sum_{i=1}^{n} d_i}{n}$$

Shear Viscosity Test Method

The shear viscosity of a filament-forming composition of the present invention is measured using a capillary rheometer, Goettfert. Rheograph 6000, manufactured by Goettfert USA of Rock Hill, S.C., USA. The measurements are conducted using a capillary die having a diameter D of 1.0 mm and a length L of 30 mm (i.e., L/30). The die is attached to the lower end of the rheometer's 20 mm barrel, which is held at a die test temperature of 75 deg. C. A preheated to die test temperature, 60 g sample of the filament-forming composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula:

$$\eta = K\gamma^{n-1}$$

wherein η is the apparent shear viscosity, K is the material's viscosity constant, n is the material's thinning index and γ is the shear rate. The reported apparent shear viscosity of the filament-forming composition herein is calculated from an interpolation to a shear rate of 3,000 sec$^{-1}$ using the power law relation.

Basis Weight Test Method

Basis weight of a fibrous structure is measured on stacks of twelve usable units using a top loading analytical balance with a resolution of +−0.001 g. The balance is protected from air drafts and other disturbances using a draft shield. A precision cutting die, measuring 8.890 cm+−0.0089 cm by 8.890 cm+−0.0089 cm is used to prepare all samples. With a precision cutting die, cut the samples into squares. Combine the cut squares to form a stack twelve samples thick. Measure the mass of the sample stack and record the result to the nearest 0.001 g.

The Basis Weight is calculated in g/m2 as follows:

Basis Weight=(Mass of stack)/[(Area of 1 square in stack)*(No. of squares in stack)]

For example,

Basis Weight (g/m$^2$)=Mass of stack (g)[79.032 (cm$^2$)/10,000 (cm$^2$/m$^2$)*12]

Report result to the nearest 0.1 g/m$^2$. Sample dimensions can be changed or varied using a similar precision cutter as mentioned above, so as that there are at least 645.16 cm$^2$ of sample area in stack and the basis weight calculation is adjusted accordingly.

Thickness Test Method

Thickness of a fibrous structure is measured by cutting 5 samples of a fibrous structure sample such that each cut sample is larger in size than a load foot loading surface of a VIR Electronic Thickness Tester Model II available from Thwing-Albert instrument Company, Philadelphia, Pa. Typically, the load foot loading surface has a circular surface area of about 20.258 cm$^2$. The sample is confined between a horizontal flat surface and the load foot loading surface. The load foot loading surface applies a confining pressure to the sample of 15.5 g/cm$^2$. The thickness of each sample is the resulting gap between the flat surface and the load foot loading surface. The thickness is calculated as the average thickness of the five samples. The result is reported in millimeters (mm).

EXAMPLES AND COMBINATIONS

An example follows:

A. A Process for Manufacturing a Water Soluble (5) Product Comprising the Steps of:
  providing a water soluble fibrous parent continuous ply web (59), said parent continuous ply web having a machine direction (MD) and cross direction (CD) orthogonal to said machine direction and a thickness in a direction orthogonal to a plane defined by said machine direction and said cross direction, wherein said parent continuous ply web extends in said cross direction between an operator edge (61) and drive edge (62) wherein said parent continuous ply web is thicker between said operator edge and said drive edge than at said drive edge and said operator edge;
  cutting said parent continuous ply web in said machine direction to provide a first continuous ply web (60) that includes said drive edge and a second continuous ply web (65) that includes said operator edge;
  superposing said first continuous ply web and said second continuous ply web to form a web stack (66) so that said operator edge and said drive edge are on opposite sides of a centerline of said web stack in said machine direction; and
  cutting and joining portions of said web stack to form said water soluble product.

B. The process according to Paragraph B, wherein the step of joining portions of said web stack is done before or after cutting portions of said web stack.

C. The process according to Paragraph A or B, further comprising the steps of:
  cutting from said parent continuous ply web in said machine direction a third continuous ply web (130) between said first continuous ply web and said second continuous ply web in said cross direction; and
  superposing said third continuous ply web with said first continuous ply web and said second continuous ply web to form said web stack.

D. The process according to Paragraph C, further comprising the step of positioning said second continuous ply web between said first continuous ply web and said third continuous ply web in said web stack; or positioning said first continuous ply web between said second continuous ply web and said third continuous ply web.

E. The process according to Paragraph C or D, wherein said first continuous ply web has a first continuous ply web belt side and an opposing first continuous ply web air side, said second continuous ply web has a second continuous ply web belt side and an opposing second continuous ply web air side, and said third continuous ply web has a third continuous ply web belt side and an opposing third continuous ply web air side; and
  wherein said web stack has an upper facing surface (600) and an opposing lower facing surface (601);
  said process further comprising the step of positioning said first continuous ply web, said second continuous ply web, and said third continuous ply web so that said upper facing surface and said lower facing surface are selected from the group consisting of said first continuous ply web belt side, said second continuous ply web belt side, and said third continuous ply web belt side and said upper facing surface is not the same as said lower facing surface.

F. The process according to Paragraph E, further comprising the step of applying between said upper facing surface and said lower facing surface an active agent (190) selected from the group consisting of unencapsulated perfume, encapsulated perfume, perfume premix, surfactant, enzyme, bleach, bleach activator, chelant, structurant, builder, organic polymeric compound, brightener, hueing agent, suds suppressor, conditioning agent, humectant, alkalinity system, pH control system, buffer alkanolamine, insect repellant, hair care agent, hair conditioning agent, skin care agent, sunscreen agent, skin conditioning agent, fabric softener, anti-wrinkling agent, anti-static agent, fabric care stain removal agent, soil release agent, dispersing agent, suds suppressing agent, suds boosting agent, anti-foam agent, fabric refreshing agent, dishwashing agent, hard surface care agent, antimicrobial agent, antibacterial agent, antifungal agent, bleach activating agent, chelating agent, builder, lotion, air care agent, carpet care agent, dye transfer-inhibiting agent, clay soil removing agent, anti-redeposition agent, polymeric soil release agent, polymeric dispersing agent, alkoxylated polyamine polymer, alkoxylated polycarboxylate polymer, amphilic graft copolymer, dissolution aid, buffering system, water-softening agent, water-hardening agent, pH adjusting agent, flocculating agent, effervescent agent, preservative, cosmetic agent, make-up removal agent, lathering agent, deposition aid agent, coacervate-forming agent, clay, thickening agent, latex, silica, drying agent, odor control agent, antiperspirant agent, cooling agent, warming agent, absorbent gel agent, anti-inflammatory agent, dye, hueing agent, pigment, acid, base, liquid treatment active agent, agricultural active agent, industrial active agent, ingestible active agent, medicinal agent, sleep aid, teeth whitening agent, tooth care agent, mouthwash agent, periodontal gum care agent, dietary agent, vitamin, minerals, water-treatment agent, water clarifying agent, water disinfecting agent, and mixtures thereof.

G. The process according to any of Paragraphs A to F, further comprising the step of providing said parent continuous ply web with a plurality of water soluble particles (95).

H. The process according to any of Paragraphs A to G, further comprising the step of:
provided a fibrous first layer (20);
providing a fibrous second layer (25) facing said first layer, said first layer and said second layer together forming said parent continuous ply web.

I. The process according to Paragraph H, further comprising the step of:
providing said water soluble particles in said fibrous second layer.

J. The process according to Paragraph H or I, wherein said first continuous ply web belt side, second continuous ply web belt side, and said third continuous ply web belt side comprise said first layer.

K. The process according to any of Paragraphs A to J, further comprising the step of applying between said second continuous ply web and said first continuous ply web an active agent selected from the group consisting of unencapsulated perfume, perfume premix, encapsulated perfume, surfactant, enzyme, bleach, bleach activator, chelant, structurant, builder, organic polymeric compound, brightener, hueing agent, suds suppressor, conditioning agent, humectant, alkalinity system, pH control system, buffer alkanolamine, insect repellant, hair care agent, hair conditioning agent, skin care agent, sunscreen agent, skin conditioning agent, fabric softener, anti-wrinkling agent, anti-static agent, fabric care stain removal agent, soil release agent, dispersing agent, suds suppressing agent, suds boosting agent, anti-foam agent, fabric refreshing agent, dishwashing agent, hard surface care agent, antimicrobial agent, antibacterial agent, antifungal agent, bleach activating agent, chelating agent, builder, lotion, air care agent, carpet care agent, dye transfer-inhibiting agent, clay soil removing agent, anti-redeposition agent, polymeric soil release agent, polymeric dispersing agent, alkoxylated polyamine polymer, alkoxylated polycarboxylate polymer, amphilic graft copolymer, dissolution aid, buffering system, water-softening agent, water-hardening agent, pH adjusting agent, flocculating agent, effervescent agent, preservative, cosmetic agent, make-up removal agent, lathering agent, deposition aid agent, coacervate-forming agent, clay, thickening agent, latex, silica, drying agent, odor control agent, antiperspirant agent, cooling agent, warming agent, absorbent gel agent, anti-inflammatory agent, dye, hueing agent, pigment, acid, base, liquid treatment active agent, agricultural active agent, industrial active agent, ingestible active agent, medicinal agent, sleep aid, teeth whitening agent, tooth care agent, mouthwash agent, periodontal gum care agent, dietary agent, vitamin, minerals, water-treatment agent, water clarifying agent, water disinfecting agent, and mixtures thereof.

L. The process according to any of Paragraphs A to K, further comprising the step of:
providing a fibrous first layer;
providing a fibrous second layer facing said first layer, said first layer and said second layer together forming said parent continuous ply web.

M. The process according to any of Paragraphs A to L, further comprising the steps of:
providing a solution of filament-forming composition;
passing said filament forming composition through one or more die block assemblies comprising a plurality of spinnerets to form a plurality of fibrous elements; and
depositing said plurality of fibrous elements onto a belt moving in said machine direction to form said parent continuous ply web;
wherein said process is a continuous process.

N. The process according to any of Paragraphs A to M, further comprising the step of printing on one or more of said first continuous ply web and said second continuous ply web.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for manufacturing a water soluble product comprising the steps of:
providing a water soluble fibrous parent continuous ply web, said parent continuous ply web having a machine direction and cross direction orthogonal to said machine direction and a thickness in a direction orthogonal to a plane defined by said machine direction and said cross direction, wherein said parent continuous ply web extends in said cross direction between an operator edge and drive edge wherein said parent continuous ply web is thicker between said operator edge and said drive edge than at said drive edge and said operator edge;
cutting said parent continuous ply web in said machine direction to provide a first continuous ply web that includes said drive edge and a second continuous ply web that includes said operator edge;
cutting from said parent continuous ply web in said machine direction a third continuous ply web between said first continuous ply web and said second continuous ply web in said cross direction;
superposing said first continuous ply web and said second continuous ply web to form a web stack so that said operator edge and said drive edge are on opposite sides of a centerline of said web stack in said machine direction;

superposing said third continuous ply web with said first continuous ply web and said second continuous ply web to form said web stack;

positioning said second continuous ply web between said first continuous ply web and said third continuous ply web in said web stack, or positioning said first continuous ply web between said second continuous ply web and said third continuous ply web in said web stack; and cutting and joining portions of said web stack to form said water soluble product;

wherein the step of joining portions of said web stack is done before or after cutting portions of said web stack;

wherein said first continuous ply web has a first continuous ply web belt side and an opposing first continuous ply web air side, said second continuous ply web has a second continuous ply web belt side and an opposing second continuous ply web air side, and said third continuous ply web has a third continuous ply web belt side and an opposing third continuous ply web air side; and wherein said web stack has an upper facing surface and an opposing lower facing surface;

said process further comprising the step of positioning said first continuous ply web, said second continuous ply web, and said third continuous ply web so that said upper facing surface and said lower facing surface are selected from the group consisting of said first continuous ply web belt side, said second continuous ply web belt side, and said third continuous ply web belt side and said upper facing surface is not the same as said lower facing surface.

2. The process according to claim 1, further comprising the step of applying between said upper facing surface and said lower facing surface an active agent selected from the group consisting of unencapsulated perfume, encapsulated perfume, perfume premix, surfactant, enzyme, bleach, bleach activator, chelant, structurant, builder, organic polymeric compound, brightener, hueing agent, suds suppressor, conditioning agent, humectant, alkalinity system, pH control system, buffer alkanolamine, insect repellant, hair care agent, hair conditioning agent, skin care agent, sunscreen agent, skin conditioning agent, fabric softener, anti-wrinkling agent, anti-static agent, fabric care stain removal agent, soil release agent, dispersing agent, suds suppressing agent, suds boosting agent, anti-foam agent, fabric refreshing agent, dishwashing agent, hard surface care agent, antimicrobial agent, antibacterial agent, antifungal agent, bleach activating agent, chelating agent, builder, lotion, air care agent, carpet care agent, dye transfer-inhibiting agent, clay soil removing agent, anti-redeposition agent, polymeric soil release agent, polymeric dispersing agent, alkoxylated polyamine polymer, alkoxylated polycarboxylate polymer, amphilic graft copolymer, dissolution aid, buffering system, water-softening agent, water-hardening agent, pH adjusting agent, flocculating agent, effervescent agent, preservative, cosmetic agent, make-up removal agent, lathering agent, deposition aid agent, coacervate-forming agent, clay, thickening agent, latex, silica, drying agent, odor control agent, antiperspirant agent, cooling agent, warming agent, absorbent gel agent, anti-inflammatory agent, dye, hueing agent, pigment, acid, base, liquid treatment active agent, agricultural active agent, industrial active agent, ingestible active agent, medicinal agent, sleep aid, teeth whitening agent, tooth care agent, mouthwash agent, periodontal gum care agent, dietary agent, vitamin, minerals, water-treatment agent, water clarifying agent, water disinfecting agent, and mixtures thereof.

3. The process according to claim 2, further comprising the step of providing said parent continuous ply web with a plurality of water soluble particles.

4. The process according to claim 3, further comprising the step of:
providing a fibrous first layer;
providing a fibrous second layer facing said first layer, said first layer and said second layer together at least partially forming said parent continuous ply web.

5. The process according to claim 4, further comprising the step of:
providing said water soluble particles in said fibrous second layer.

6. The process according to claim 5, wherein said first continuous ply web belt side, said second continuous ply web belt side, and said third continuous ply web belt side comprise said first layer.

7. The process according to claim 1, further comprising the step of applying between said second continuous ply web and said first continuous ply web an active agent selected from the group consisting of unencapsulated perfume, encapsulated perfume, perfume premix, surfactant, enzyme, bleach, bleach activator, chelant, structurant, builder, organic polymeric compound, brightener, hueing agent, suds suppressor, conditioning agent, humectant, alkalinity system, pH control system, buffer alkanolamine, insect repellant, hair care agent, hair conditioning agent, skin care agent, sunscreen agent, skin conditioning agent, fabric softener, anti-wrinkling agent, anti-static agent, fabric care stain removal agent, soil release agent, dispersing agent, suds suppressing agent, suds boosting agent, anti-foam agent, fabric refreshing agent, dishwashing agent, hard surface care agent, antimicrobial agent, antibacterial agent, antifungal agent, bleach activating agent, chelating agent, builder, lotion, air care agent, carpet care agent, dye transfer-inhibiting agent, clay soil removing agent, anti-redeposition agent, polymeric soil release agent, polymeric dispersing agent, alkoxylated polyamine polymer, alkoxylated polycarboxylate polymer, amphilic graft copolymer, dissolution aid, buffering system, water-softening agent, water-hardening agent, pH adjusting agent, flocculating agent, effervescent agent, preservative, cosmetic agent, make-up removal agent, lathering agent, deposition aid agent, coacervate-forming agent, clay, thickening agent, latex, silica, drying agent, odor control agent, antiperspirant agent, cooling agent, warming agent, absorbent gel agent, anti-inflammatory agent, dye, hueing agent, pigment, acid, base, liquid treatment active agent, agricultural active agent, industrial active agent, ingestible active agent, medicinal agent, sleep aid, teeth whitening agent, tooth care agent, mouthwash agent, periodontal gum care agent, dietary agent, vitamin, minerals, water-treatment agent, water clarifying agent, water disinfecting agent, and mixtures thereof.

8. The process according to claim 7, further comprising the step of:
providing a fibrous first layer;
providing a fibrous second layer facing said first layer, said first layer and said second layer together forming said parent continuous ply web.

9. The process according to claim 8 further comprising the step of providing said parent continuous ply web with a plurality of water soluble particles.

10. The process according to claim 9, further comprising the step of:

providing said water soluble particles in said fibrous second layer.

11. The process according to claim 1, further comprising the steps of:
    providing a fibrous first layer;
    providing a fibrous second layer facing said first layer, said first layer and said second layer together forming said parent continuous ply web.

12. The process according to claim 11, further comprising the step of providing said parent continuous ply web with a plurality of water soluble particles in said fibrous second layer.

13. The process according to claim 1, further comprising the steps of:
    providing a solution of filament-forming composition;
    passing said filament forming composition through one or more die block assemblies comprising a plurality of spinnerets to form a plurality of fibrous elements; and
    depositing said plurality of fibrous elements onto a belt moving in said machine direction to form said parent continuous ply web;
    wherein said process is a continuous process.

14. The process according to claim 1, further comprising the step printing on one or more of said first continuous ply web and said second continuous ply web.

* * * * *